United States Patent
Tsujimura et al.

(10) Patent No.: US 8,718,467 B2
(45) Date of Patent: May 6, 2014

(54) METHOD OF SWITCHING OPTICAL PATH, AND APPARATUS THEREOF

(75) Inventors: Takeshi Tsujimura, Tsukuba (JP); Kuniaki Tanaka, Tsukuba (JP); Koichi Yoshida, Tsukuba (JP); Kazunori Katayama, Tsukuba (JP); Yuji Azuma, Tsukuba (JP); Masatoshi Shimizu, Tsukuba (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 443 days.

(21) Appl. No.: 13/130,108

(22) PCT Filed: Nov. 24, 2009

(86) PCT No.: PCT/JP2009/069806
§ 371 (c)(1),
(2), (4) Date: May 19, 2011

(87) PCT Pub. No.: WO2010/064561
PCT Pub. Date: Jun. 10, 2010

(65) Prior Publication Data
US 2011/0236015 A1   Sep. 29, 2011

(30) Foreign Application Priority Data

Dec. 2, 2008 (JP) ................................ 2008-308007
Apr. 2, 2009 (JP) ................................ 2009-090454
Apr. 2, 2009 (JP) ................................ 2009-090455

(51) Int. Cl.
*H04B 10/08* (2011.01)

(52) U.S. Cl.
USPC ............ 398/16; 398/2; 398/5; 398/9; 398/25; 398/30; 398/33; 398/45; 398/58; 398/66; 398/154; 398/158

(58) Field of Classification Search
USPC ............ 398/1–38, 45–88, 154, 155, 158, 161
See application file for complete search history.

(56) References Cited

U.S. PATENT DOCUMENTS 6,735,396 B2 * 5/2004 Poustie ......................... 398/155
7,103,281 B1 * 9/2006 Poustie ......................... 398/154
(Continued)

FOREIGN PATENT DOCUMENTS

JP   08-102710   4/1996
JP   09-061298   3/1997
(Continued)

OTHER PUBLICATIONS

Azuma, et al., "Basic investigation of new transfer method for optical access line—Optical access line transfer system without service interrupt", IEICE Technical Report, Nov. 13, 2008, vol. 108, No. 310, consisting of 7 pages (with English abstract).

(Continued)

*Primary Examiner* — Li Liu
(74) *Attorney, Agent, or Firm* — Ohlandt Greeley Ruggiero & L.L.P.

(57) ABSTRACT

Terminals of upstream and downstream sides of an in-service line and a detour line are connected by optical couplers. An optical oscilloscope is connected to one optical coupler, and a chirped pulse light source is connected to the other optical coupler to thereby form dualized lines. The detour line includes an optical line length adjuster for compensating for the phase difference of optical transmission signals that occurs because of the optical line length difference with the in-service line. Pulse light in which an optical frequency is chirped is transmitted from the chirped pulse light source. The pulse light is branched by the second optical coupler, passes through the in-service line and the detour line, is multiplexed again by the first optical coupler, and is measured by the optical oscilloscope. While matching an arrival time of the pulse light, the optical line length is adjusted by the optical line length adjuster so as to minimize the size of upper and lower limits of an interference waveform generated in an upper part of the pulse light waveform or so as to make a frequency of an interference waveform become zero.

18 Claims, 29 Drawing Sheets

(56) References Cited

U.S. PATENT DOCUMENTS

| | | | |
|---|---|---|---|
| 7,751,713 B2* | 7/2010 | Perkins et al. | 398/81 |
| 7,869,713 B2* | 1/2011 | Porzi et al. | 398/98 |
| 2010/0310252 A1* | 12/2010 | Healey | 398/6 |

FOREIGN PATENT DOCUMENTS

| | | |
|---|---|---|
| JP | 11109182 A | 4/1999 |
| JP | 3573606 | 7/2004 |
| JP | 2007-294565 | 11/2007 |

OTHER PUBLICATIONS

Tanaka, et al., "Synchronous Transmission Transfer Method for Dual Optical Line Using Fee Space Optics Technique", proceedings of the IEICE General Conference 2009, vol. 2, IEICE, Mar. 4, 2009, consisting of 3 pages (with partial English Translation consisting of 1 page).

Tanaka, et al., "Frame-loss-free Line Switching Method for in Optical Access Network using Interferometry Line Length Measurement", Optical Fiber Communication-includes post deadline papers, 2009, PDPD6 (consisting of 3 pages).

Tsujimura, et al., "High resolution optical measurement of fiber optics transmission line length", ICROS-SICE, 2009, pp. 5576-5581.

Tanaka, et al., "Frame-loss-free Line Switching Method for In-service Optical Access Network using Interferometry Line Length Measurement", presented at the OFC2009, San Diego, CA, 2009, Postdeadline paper PDPD6 (consisting of 4 pages).

Tanaka, et al., "Frame-Loss-Free Optical Line Switching System for In-Service Optical Network", IEEE Journal of Lighwave Technology, vol. 28, No. 4, pp. 539-546, Feb. 15, 2010.

International Search Report dated Mar. 2, 2010 for corresponding International Patent Application No. PCT/JP2009/069806 (with English translation).

International Preliminary Report on Patentability dated Jun. 7, 2011 for corresponding International Patent Application No. PCT/JP2009/069806 with English translation.

\* cited by examiner

METHOD OF SWITCHING OPTICAL PATH, AND APPARATUS THEREOF

BACKGROUND

1. Field of the Disclosure

The present disclosure relates to an optical communication switching system with dualized lines including an in-service line (a first optical communication line) and a detour line (a second optical communication line) as an optical communication line, and more particularly, to a technique of transferring a signal of the in-service line to the detour line without disrupting a communication service while reducing deterioration of the communication signal quality resulting from dualization of an optical transmission signal and continuing a transmission logic link.

2. Discussion of the Background Art

In order to construct an economic optical communication system, a passive optical network (PON) system in which a plurality of outdoor transmission termination device is consolidated by a single indoor transmission device has been devised (see Japanese Patent Application Laid-Open (JP-A) No. 8-102710 "Optical Transmission Device"). Thus, the cost of communication facilities has greatly been reduced, and movement of a conversion to an optical system has been under way. Further, as the transmission capacity increases like a dense wavelength division multiplexing (DWDM) or a dense time division multiplexing (DTDM), a service that requires a real time property like an image or optical telephone or a service that is high in added value has been being spread.

Conventionally, there frequently occurs a case in which a line route is forced to change due to a road widening work, a bridge replacement work, or other equipment works (a new installation or a repair of electricity or tap water) on an outdoor optical line facility (hereinafter, referred to as an interference relocating work). In this situation, when the interference relocating work on a communication facility that supports the above described service is performed, since a large amount of traffic stops at a time due to the work, influence over a number of users is immeasurable. In order to reduce the influence, for example, a work time has been divided, or the relocating work has been performed at a time zone having a small traffic amount, for example, from midnight to early morning. That is, a facility operation having low efficiency has been performed.

In such a situation, a tool for reducing a switching connection time of an optical line as much as possible and reducing a communication recovery time has been commercialized (see Japanese Patent No. 3573606 "Optical Fiber Cable Three-Point Switching Connection System"). However, it is impossible for the present system to avoid missing of transmission data or a mismatch of a transmission logic link that results from temporal separation of the optical line or an optical line length difference between the in-service line and the detour line (a phase difference of a transmission signal). Further, switching in which a switching connection time is nearly zero may be performed such that a transmission route is dualized at the time of construction of an optical line facility, and an in-service signal is previously provided from a transmission device to two routes. However, even in this case, there has been a problem in that a mismatch of a transmission logic link is unavoidable due to a route length difference.

In any case, it is unavoidable to disperse a work period so that influence (service deterioration) on a user can be minimized in view of a technical limit of such medium switching and further prolong a midnight work.

As represented by switching of a PON system, when the interference relocating work on the outdoor optical line facility is performed, services of many users should be stopped, and the influence is immeasurable. Since it is realistically impossible to match a service stop time (date and time) on many users and obtain agreement from many users, the relocating work should be performed at a time zone having a small traffic amount, for example, from midnight to early morning. Thus, there has been a problem in that a service has directly been influenced and there has been a lack of planning. Further, even in a case of a small number of users as in a single star (SS) network system, since a dedicated line in which it is actually difficult to stop a service is mostly used, the situation is not different from the PON system.

In light of the foregoing, it is an object of the present disclosure to provide an optical line switching method and apparatus of dualized lines in which phases of optical transmission signals can be matched by forming dualized lines having the same optical line length so that missing of transmission data or a mismatch of a transmission logic link can be avoided, and a service can continue.

SUMMARY

In order to achieve the above object, an optical communication switching system of dualized line according to the present disclosure has a configuration of the following aspect.

(1) An optical communication switching system in which dualized lines are formed by selectively connecting a second optical transmission line between first and second optical transmission devices separately from a first optical transmission line includes a first optical coupler means in which an optical signal I/O terminal of the first optical transmission device is connected to a first optical I/O terminal, and each of one sides of the first and second optical transmission lines are connected to second and third optical I/O terminals, a second optical coupler means in which an optical signal I/O terminal of the second optical transmission device is connected to a first optical I/O terminal, and each of the other sides of the first and second optical transmission lines are connected to second and third optical I/O terminals, a test light source that is connected to a fourth optical I/O terminal of the second optical coupler means and transmits pulse light in which an optical frequency is chirped, an optical measurement device that is connected to a fourth optical I/O terminal of the first optical coupler means and measures the pulse light output from the terminal, and a free space optics (FSO) device that is disposed on the second optical transmission line and compensates for a transmission time of pulse light transmitted through the line by expansion and contraction of a spatial optical line length, and there is a characteristic that pulse light transmitted from the test light source is branched by the second optical coupler means, pulse light that has passed through the first optical transmission line and pulse light that has passed through the second optical transmission line are multiplexed by the first optical coupler means and then input to the optical measurement device, an arrival time of pulse light passing through each optical transmission line and an interference waveform generated in an upper part of a pulse waveform are measured by the optical measurement device, an optical line length of the FSO device is adjusted so that the interference waveform becomes appropriate while matching the measured arrival time of pulse light, and an optical transmission signal between the first and second optical transmission devices is switched from the first optical transmission line to the second optical transmission line while dualizing the optical transmission signal.

(2) There is a characteristic that the configuration (1) further includes: a level adjustment means that is disposed on at least one of the first optical transmission line and the second optical transmission line and, when an optical transmission signal transmitted between the first optical transmission device and the second optical transmission device passes through both the first optical transmission line and the second optical transmission line, generates a level difference on power of the optical transmission signal.

(3) There is a characteristic in the configuration (1), for an adjustment of the interference waveform, an optical line length of the FSO device is adjusted so that a size of an upper limit and a lower limit of the interference waveform becomes minimum.

(4) There is a characteristic in the configuration (1), the test light source emits pulse light in which the optical frequency is chirped linearly or in a state close to a linear form, the optical measurement device includes a Fast Fourier transformer (FFT) that performs Fast Fourier transform on an interference waveform generated in an upper part of the pulse light waveform, and for an adjustment of the interference waveform, Fast Fourier transform is performed on the interference waveform, an optical line length of the FSO device is extended or contracted so that using a specific frequency component obtained at that time as a reference, the component moves to a frequency zero side, the optical line length is continuously extended or contracted again until the frequency component as the reference is measured, and the FSO device is adjusted so that the optical line length becomes half the extended or contracted length.

Further, a dualized line switching method according to the present disclosure has a configuration of the following aspect.

(5) As an optical communication switching system in which dualized lines are formed by selectively connecting a second optical transmission line between first and second optical transmission devices separately from a first optical transmission line, it is used in an optical communication switching system that includes a first optical coupler means in which an optical signal I/O terminal of the first optical transmission device is connected to a first optical I/O terminal, and each of one sides of the first and second optical transmission lines are connected to second and third optical I/O terminals, a second optical coupler means in which an optical signal I/O terminal of the second optical transmission device is connected to a first optical I/O terminal, and each of the other sides of the first and second optical transmission lines are connected to second and third optical I/O terminals, a test light source that is connected to a fourth optical I/O terminal of the second optical coupler means and transmits pulse light in which an optical frequency is chirped, an optical measurement device that is connected to a fourth optical I/O terminal of the first optical coupler means and measures pulse light output from the terminal, and a free space optics (FSO) device that is disposed on the second optical transmission line and compensates for a transmission time of pulse light transmitted through the line by expansion and contraction of a spatial optical line length, and there is a characteristic that pulse light transmitted from the test light source is branched by the second optical coupler means, pulse light that has passed through the first optical transmission line and pulse light that has passed through the second optical transmission line are multiplexed by the first optical coupler means and then input to the optical measurement device, an arrival time of pulse light passing through each optical transmission line and an interference waveform generated in an upper part of the pulse light waveform are measured by the optical measurement device, an optical line length of the FSO device is adjusted so that the interference waveform becomes appropriate while matching the measured arrival time of pulse light, and an optical transmission signal between the first and second optical transmission devices is switched from the first optical transmission line to the second optical transmission line while dualizing the optical transmission signal.

(6) There is a characteristic in the configuration (5) that pulse light emitted from the test light source is branched by the second optical coupler means and multiplexed by the first optical coupler means, and when an optical transmission signal transmitted between the first optical transmission device and the second optical transmission device passes through both the first optical transmission line and the second optical transmission line, a level difference is generated on power of the optical transmission signal.

(7) There is a characteristic in the configuration (5) that for an adjustment of the interference waveform, an optical line length of the FSO device is adjusted so that a size of an upper limit and a lower limit of the interference waveform becomes minimum.

(8) There is a characteristic in the configuration (5) that the test light source emits pulse light in which the optical frequency is chirped linearly or in a state close to a linear form, and when the optical measurement device includes a Fast Fourier transformer (FFT) that performs Fast Fourier transform on an interference waveform generated in an upper part of the pulse light waveform, for an adjustment of the interference waveform, Fast Fourier transform is performed on the interference waveform, an optical line length of the FSO device is extended or contracted so that using a specific frequency component obtained at that time as a reference, the component moves to a frequency zero side, the optical line length is continuously extended or contracted again until the frequency component as the reference is measured, and the FSO device is adjusted so that the optical line length becomes half the extended or contracted length.

That is, in (1) the optical communication switching system of the dualized lines and in (5) the method of switching dualized lines according to the present disclosure, as a method of compensating for a phase difference of the optical transmission signals occurring due to the optical line length difference between a first optical transmission line (an in-service line) and a second optical transmission line (a detour line), the dualized lines are configured such that upstream side terminals and downstream side terminals of the optical transmission lines are connected by the first and second optical coupler means, respectively, the first optical transmission device and the optical measurement device (the optical oscilloscope) are connected to the other optical input/output (I/O) terminals of the first optical coupler means, and the second optical transmission device and the test light source are connected to the other optical I/O terminals of the second optical coupler means.

Here, on the second optical transmission line, a free space optics (FSO) device that compensates for the phase difference of the optical transmission signals occurring due to the optical line length difference between the line and the first optical transmission line through expansion and contraction of a spatial optical line length is disposed.

Then, pulse light in which the optical frequency is chirped is transmitted from the test light source, and the pulse light is branched by the second optical coupler means, passes through each of the first and second optical transmission lines, is multiplexed by the first optical coupler means again, and measured by the optical measurement device.

In the above configuration, in the system of (3) and the method of (7), an optical line length of the FSO device is adjusted so that a size of an upper limit and a lower limit of the interference waveform generated in a waveform upper part of the pulse light becomes minimum while matching the arrival time of the pulse light.

Further, in the system of (4) and the method of (8), as a method of compensating for the phase difference of the pulse light transmission signals occurring due to the optical line length difference between the first and second optical transmission lines, the test light source emits pulse light in which the optical frequency is chirped linearly or in a state close to a linear form (hereinafter, referred to as chirped pulse light), Fast Fourier transform is performed on the interference waveform generated in a waveform upper part of the pulse light while matching the arrival time of the pulse light when the pulse light is branched by the second optical coupler means, passes through each of the first and second optical transmission lines, is multiplexed by the first optical coupler means again, and measured by the optical measurement device, an optical line length of the FSO device is extended or contracted so that using a specific frequency component obtained at that time as a reference, the component moves to a frequency zero side, the optical line length is continuously extended or contracted again until the frequency component as the reference is measured, and the FSO device is adjusted so that the optical line length becomes half the extended or contracted length.

According to (3) and (7), when the chirped pulse lights transmitted from the same test light source are branched into the first and second optical transmission lines by the second optical coupler of the dualized lines and multiplexed by the first optical coupler again, the arrival time difference of the chirped pulse light is measured by the optical measurement device. The arrival time difference is compensated by extending or contracting the spatial optical line length in the FSO device disposed at the second optical transmission line side (coarse adjustment). Further, since the chirped pulse light in which the arrival time difference has been compensated includes the interference waveform generated in the upper part of the waveform, by finely adjusting the optical line length of the FSO device so that the size of the upper limit and the lower limit of the interference waveform can be minimum, the optical line length can be matched up to the millimeter (mm) order (fine adjustment).

Also, according to (4) and (8), when the optical measurement device compensates for the optical line difference between the first and second optical transmission lines, after coarse adjustment of (3) and (7) is performed, Fast Fourier transform is performed on the interference waveform generated in the waveform upper part of the chirped pulse light, the optical line length of the FSO device is extended or contracted so that the frequency component can move to the zero side by using a specific frequency component obtained at this time as a reference, extension or contraction is stopped at a point in time when the frequency component as the reference is measured again, and the FSO device is disposed at the position of half the extended or contracted length. Thus, the optical line length can be matched with the millimeter (mm) order (fine adjustment).

As described above, since the transmission time difference occurring due to the optical line length difference between the first and second optical transmission lines can be resolved, the logic link state of the in-service signal can continue, and dualization and switching of the transmission signal can be performed without stopping the service.

When the optical transmission signals transmitted from the first and second optical transmission devices are branched into the first optical transmission line (the in-service line) and the second optical transmission line (the detour line) through each of the dualized lines and then multiplexed again, there is a small difference in arrival time between the optical transmission signals propagated along the dualized lines, and the optical frequency difference between the optical transmission signals is generated as bit interference noise.

For this reason, as in (2) and (6), a level adjustment means that adjusts power of the optical transmission signal may be disposed at any one of the first optical communication line and the second optical communication line. By setting the level difference to power of the optical transmission signal propagated along each of the first optical transmission line and the second optical transmission line by using the level adjustment means, optical bit interference noise occurring when the optical transmission signals are multiplexed can be reduced, and deterioration of the communication quality can be suppressed.

There is a characteristic in (1) to (8) that the FSO device includes a pair of corner cubes disposed in a reference axial direction, facing each other, an optical system that irradiates light propagated along an optical line inserted into the second optical transmission line between the corner cubes and re-couples light reflected between the corner cubes to the optical line, an adjustment means that changes a distance between the corner cubes in the reference axial direction and adjusts a length of a reflection path of the light, a switching means that switches the number of times that the light is reflected between the corner cubes in a stepwise manner, and an evacuation means that evacuates the light to a sub-optical line in which an optical line length difference with the optical line is equal to or less than a specified value at the time of switching of the number of reflection times.

The optical transmission signal propagated along the second optical transmission line or the signal light of the chirped pulse light is irradiated to a space between a pair of corner tubes. If the optical line length of the space is extended or contracted by the adjustment means, the transmission time of the signal lights can be adjusted, but it is difficult to obtain a broad adjustment range only through it.

Thus, according to the above configuration, the number of reflection times of the signal light between the corner cubes is switched by the switching means in a stepwise manner. Thus, the optical line length can be changed with the broad width. At the time of switching, the signal light can be evacuated to the sub optical line by the evacuation means.

The sub optical line is disposed in parallel with the optical line. The difference of the optical line length with the optical line has a specified value or less for continuing a link in a communication system such as within ±8 cm. Thus, the optical line length can be adjusted without disrupting the communication service.

Further, there is a characteristic in (1) to (8) that a FSO device according to another embodiment includes a pair of optical couplers that branch-couples an optical line between a pair of optical I/O ports inserted into the second optical transmission line to two systems of optical lines, a pair of optical attenuators that are disposed on the two systems of optical lines, respectively, and turn on or off optical transmission of the optical line of a corresponding system, a pair of optical switch circuits that are disposed on the two systems of optical lines, serially connect optical switches, which selectively switching-connect n (n is a natural number equal to or more than 2) systems, respectively, in multiple stages, and extends an optical line length in certain length unit by selectively connecting a plurality of optical fibers whose length is adjusted in certain length unit by each optical switch, and an optical line length adjustment means that is disposed on at least one of the two systems of optical lines and continuously varies an optical line length of the optical line of a corresponding system by the certain length or more.

The optical coupler has a characteristic that does not depend on a wavelength of transmission light. The optical line length adjustment means includes a corner cube that reflects light emitted from a part of the optical line and returns to the optical line and a movement mechanism that moves the corner cube along an axis of light output from the optical line and reflected light.

Further, the optical line length adjustment means is disposed in each of the two systems, and as an optical line length of one system is extended, an optical line length of the other system is contracted. The optical switch circuit includes N optical switches that are serially connected and includes one side to which an optical fiber of a certain length is connected and the other side to which an optical fiber having an optical line difference length of a ratio of $2^0, 2^1, \ldots,$ and $2^{N-1}$ to the certain length is connected.

According to the above configuration, the optical line length of the passing path by the optical fiber can continuously be changed. Thus, the FSO device that can arbitrarily adjust the optical line length can be provided. Thus, the optical line length can be adjusted without disrupting the communication service.

DISCLOSURE

The present disclosure can provide an optical line switching method and apparatus of dualized lines in which phases of optical transmission signals can be matched by forming dualized lines having the same optical line length so that missing of transmission data or a mismatch of a transmission logic link can be avoided, and a service can continue.

BRIEF DESCRIPTION OF THE DRAWINGS

FIG. 7A illustrates a pulse waveform having an optical line difference of about 99 m.

FIG. 7B illustrates a pulse waveform having an optical line difference of about 38 m.

FIG. 7C illustrates a pulse waveform having an optical line difference of about 18 m, FIG. 7D illustrates a pulse waveform in which an optical line difference is nearly matched, wherein A represents a detour side pulse waveform, and B represents an in-service side pulse waveform.

FIG. 8A illustrates an interference waveform having an optical line difference of several tens of centimeters (cm).

FIG. 8B illustrates an interference waveform having an optical line difference of ten and several centimeters (cm).

FIG. 8C illustrates an interference waveform having an optical line difference of several centimeters (cm).

FIG. 8D illustrates an interference waveform having an optical line difference of several millimeters (mm).

FIG. 15A illustrates a case in which amplitudes of optical transmission signals are the same.

FIG. 15B illustrates a case in which amplitudes of optical transmission signals are 10:1.

FIG. 20A illustrates a case in which a spatial optical line length S is $2L \leq S \leq 4L$.

FIG. 20B illustrates a case in which a spatial optical line length S is $4L \leq S \leq 8L$.

FIG. 20C illustrates a case in which a spatial optical line length S is $8L \leq S \leq 16L$.

FIG. 24A illustrates a case in which a spatial optical line length S is $2L \leq S \leq 4L$.

FIG. 24B illustrates a case in which a spatial optical line length S is $4L \leq S \leq 8L$.

FIG. 24C illustrates a case in which a spatial optical line length S is $8L \leq S \leq 16L$.

FIG. 26A is a view when corner cubes 613A and 613B has moved to a system B side.

FIG. 26B is a view when ON and OFF of optical attenuators 614A and 614B have been switched, and light has been conducted only to the system B.

FIG. 26C is a view when corner cubes 613A and 613B has moved to a system A side.

FIG. 26D is a view when ON and OFF of optical attenuators 614A and 614B have been switched, and light has been conducted only to the system A.

FIG. 27A is a view when corner cubes 613A and 613B has moved to a system B side.

FIG. 27B is a view when ON and OFF of optical attenuators 614A and 614B have been switched, and light has been conducted only to the system B.

FIG. 27C is a view when corner cubes 613A and 613B has moved to a system A side.

FIG. 27D is a view when ON and OFF of optical attenuators 614A and 614B have been switched, and light has been conducted only to the system A.

DETAILED DESCRIPTION OF THE PREFERRED EMBODIMENT

Figure 1:
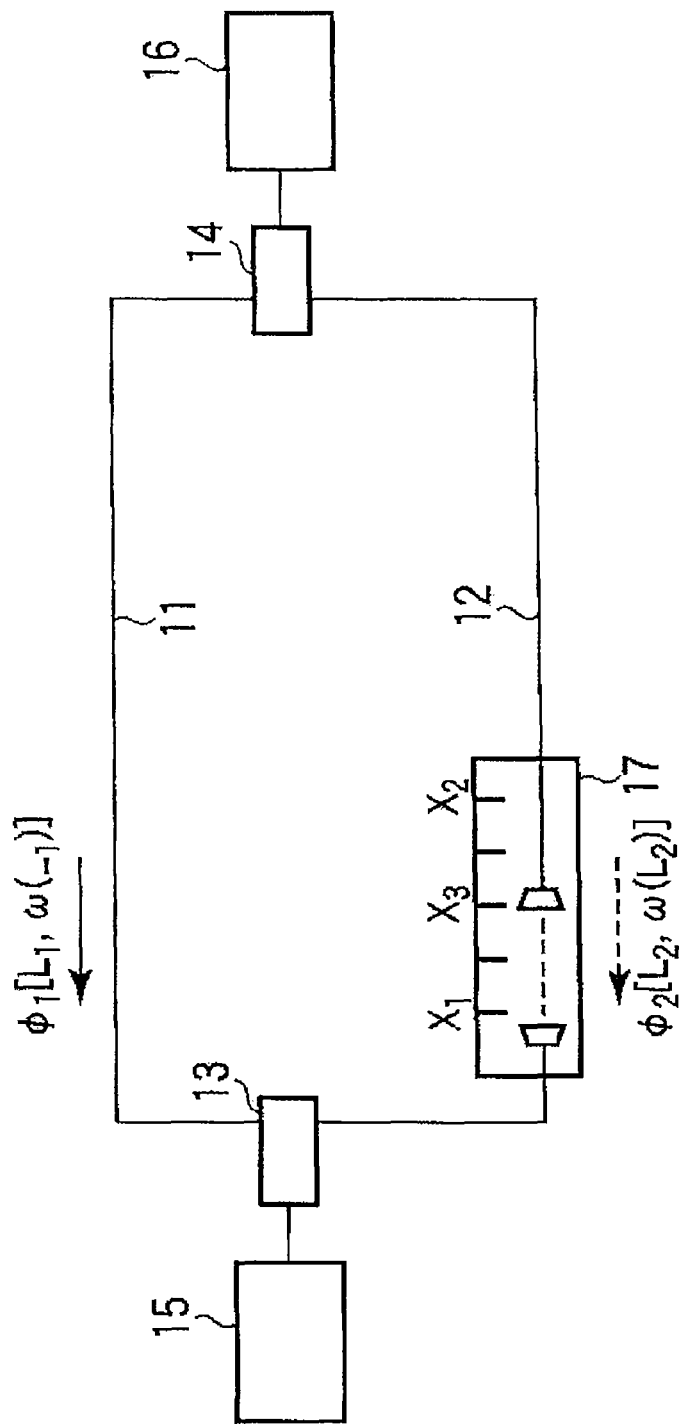
FIG. 1 is an image view illustrating an aspect in which a chirped pulse light is propagated along dualized lines according to the present disclosure.

Hereinafter, embodiments of the present disclosure will be described with reference to the accompanying drawing. The embodiments described below are exemplary embodiments of the present disclosure, and the present disclosure is not limited to the following embodiments. In this disclosure and drawings, like reference numerals denote like parts.

First, a method of detecting an optical line difference of dualized lines related to "a principle of detecting an optical line difference by optical Interference" that is the basis of the present disclosure will be described with reference to FIGS. 1 and 2.

FIG. 1 is an image view illustrating an aspect in which chirped pulse light is propagated along dualized lines. In FIG. 1, 11 denotes an in-service line, 12 denotes a detour line, one terminal of each line is connected to an optical coupler 13, and the other terminal thereof is connected to an optical coupler 14. An optical oscilloscope 15 is connected to the optical coupler 13, and a chirped pulse light source 16 is connected to the optical coupler 14. In the detour line 12, an optical line length adjuster (a free space optics (FSO) device) 17 that increases or decreases an optical line length is interposed. In the optical line length adjuster 17, $X_1$ represents an optical line length adjustment position corresponding to a frequency $\omega_0$, $X_2$ represents an optical line length adjustment position corresponding to a frequency $\omega_1$, and $X_3$ represents an optical line length matching point.

Figure 2:
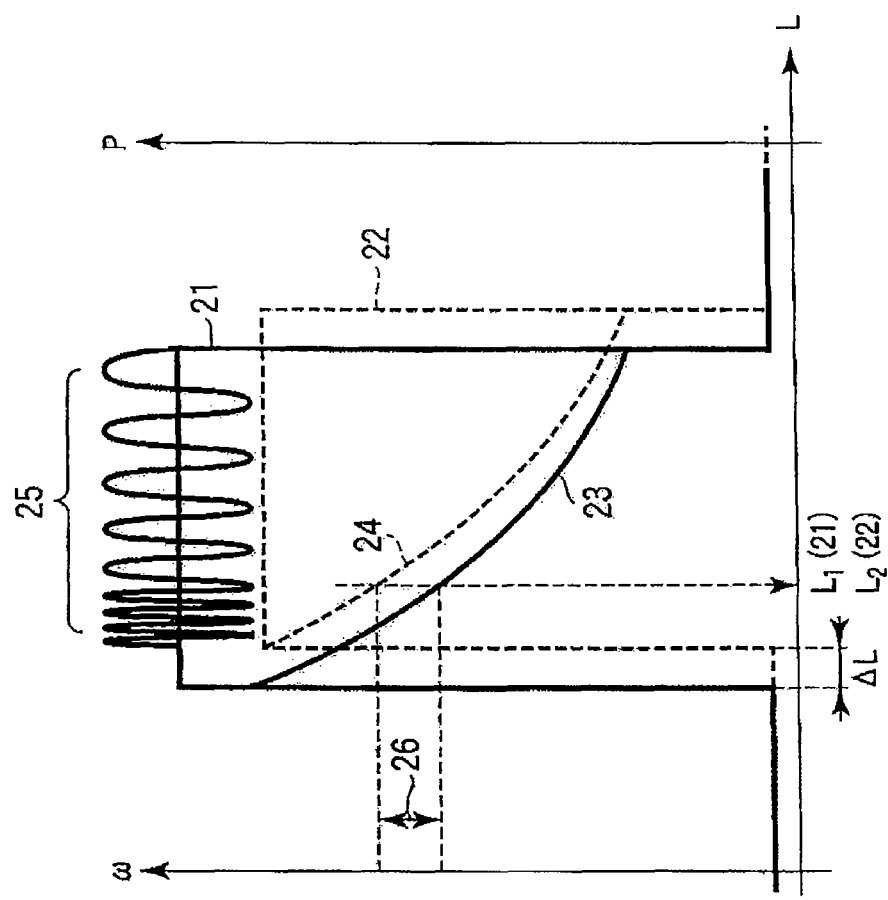
FIG. 2 is an image view illustrating an optical interference waveform in multiplexed pulse light of an optical coupler 13 in dualized lines illustrated in FIG. 1.

FIG. 2 is an image view illustrating an optical interference waveform in multiplexed pulse light of the optical coupler 13. In FIG. 2, 21 represents power of in-service side pulse light, 22 represents power of detour side pulse light, 23 represents a frequency chirp curve of in-service side pulse light, 24 represents a frequency chirp curve of detour side pulse light, 25 represents an optical interference waveform, and 26 represents an optical frequency difference ($\Delta w$).

As illustrated in FIG. 1, when chirped pulse light transmitted from the chirped pulse light source 16 passes through the dualized lines of a Mach-Zehnder type including the in-service line 11 and the detour line 12, lights that have different optical frequencies due to the optical line difference $\Delta L$ ($=\Delta t \cdot c/n$) are multiplexed and are observed as an interference waveform (an alternating current (AC) component) of a difference frequency component $\Delta \omega$ by the optical oscilloscope 15. If pulse light C that is branched by the optical coupler 14 and then propagated along the in-service line 11 and pulse light $\phi_2$ that is branched by the optical coupler 14 and then propagated along the detour line 12 are approximated by a plane wave, they are expressed by the following Formulas (1) and (2).

$$\phi_1\{L_1,\omega L_1)\} = A \cdot \exp\left[-i\{k_0 \cdot n \cdot L_1 - \omega(L_1) \cdot t + \phi_0\}\right] \quad (1)$$

$$\phi_2\{L_2,\omega L_2)\} = B \cdot \exp\left[-i\{k_0 \cdot n \cdot L_2 - \omega(L_2) \cdot t + \phi_0\}\right] \quad (2)$$

Here, $L_1$ and $L_2$ represent an optical line length of the in-service line 11 and an optical line length of the detour line 12, respectively. $\omega(L_1)$ and $\omega(L_2)$ represent an optical frequency at the optical line length $L_1$ and an optical frequency at the optical line length $L_2$, respectively. A and B each represents the amplitude, and $k_0$ represents a wavenumber in vacuum. n represents a refractive index of the core, and $\phi_0$ represents an initial phase.

Here, since a current value I measured by the optical oscilloscope 15 is in proportion to the square of an interference wave in which the pulse light $\phi_1$ and the pulse light $\phi_2$ are superimposed, the current value I is obtained by the following Formula (3). Here, it is assumed that optical-electric conversion efficiency is 1, and polarization coupling efficiency at the time of multiplexing is also 1.

$$I = |\phi_1 + \phi_2^*|^2 \quad (3),$$

where * denotes a complex conjugate.

By substituting Formulas (1) and (2) into Formula (3), the following Formula (4) is obtained.

$$I = |A|^2 + |B|^2 \pm 2 \cdot |A| \cdot |B| \cdot \cos(k_0 \cdot n \cdot \Delta L - \Delta \omega \cdot t) \quad (4)$$

where $\Delta L = L_1 - L_2$, and $\Delta \omega = \omega(L_1) - \omega(L_2)$.

As can be seen from FIG. 2, when there is no optical line difference ($\Delta L = 0$), since the frequencies of lights to be multiplexed are the same as each other and so $\Delta \omega$ becomes "0," a cosine part of a third term of Formula (4) becomes "1," so that an AC component disappears from the current value I. That is, the optical line difference of the dualized lines can be detected by using the fact that the current value I becomes a constant value.

Next, an optical line difference detection method (1) will be described.

FIG. 3 is an image illustrating a change in phase cycle of an interference waveform in the process of matching the optical line lengths of the dualized lines. In FIG. 3, 31 represents multiplexed pulse light, 32 to 34 represent an upper limit-lower limit width of the interference waveform, 35 to 37 represent a locus of the interference waveform when it is assumed that there is multiplexed pulse light, and 38 to 40 represent the amplitude of the interference waveform.

Figure 3A:
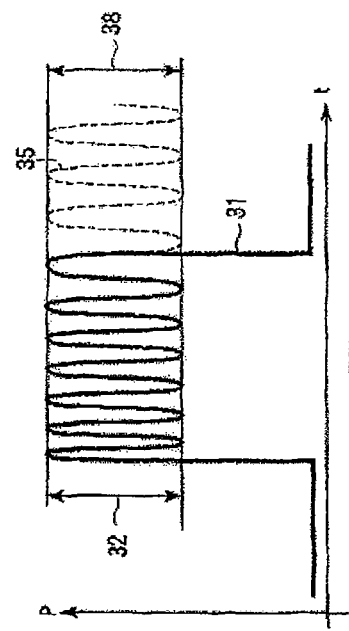
FIG. 3A is an image view illustrating a change in phase cycle of an interference wave in the process of matching the optical line lengths of the dualized lines illustrated in FIG. 1. The image is a view illustrating a case in which an optical line difference ΔL is large.
Figure 3B:
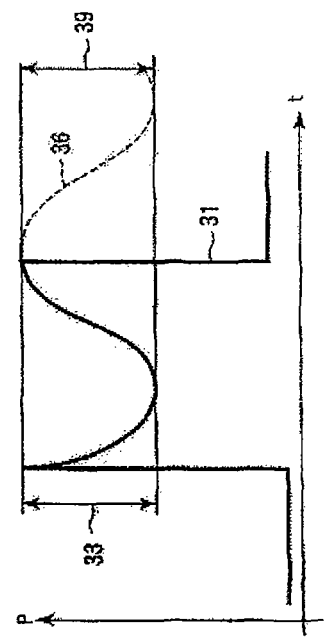
FIG. 3B is an image view illustrating a change in phase cycle of an interference wave in the process of matching the optical line lengths of the dualized lines illustrated in FIG. 1. The image is a view illustrating a case in which an optical line difference ΔL is being reduced.

As can be seen from FIG. 3, when the optical line difference $\Delta L$ increases, the frequency difference $\Delta \omega$ of the multiplexed pulse light 31 also increases, and as a result, the phase cycle decreases (FIG. 3(A)). Next, the frequency difference $\Delta \omega$ of the multiplexed pulse light 31 decreases, and as a result the phase cycle increases (FIG. 3(B)) when the optical line difference $\Delta L$ decreases. Further, when there is no optical line difference $\Delta L$, there is also no frequency difference $\Delta \omega$ of the multiplexed pulse light 31. As a result, an interference waveform having a phase cycle is not generated in an upper part of the multiplexed pulse.

In order not to truly cause interference, since a wavelength of chirped pulse light used for interference is about 1 to 2 μm, a technique of controlling a distance shorter than at least the above wavelength is required in the optical line length adjuster 17. However, even if the optical line length adjuster having a high degree of distance accuracy is prepared, it is realistically difficult to avoid a fluctuation of the optical frequency of the chirped pulse light or expansion and contraction of the optical line as a transmission medium caused by a temperature change. Thus, it does not become a perfect direct current (DC) component and is observed as a part of an interference waveform having a long phase cycle (FIG. 3(C)). In short, interferences appearing on the top floor of the multiplexed pulse light 31 are part of waveforms that are the same in amplitude (38 to 40 in FIG. 3) but different in phase cycle (35 to 37 in FIG. 3).

Figure 3C:
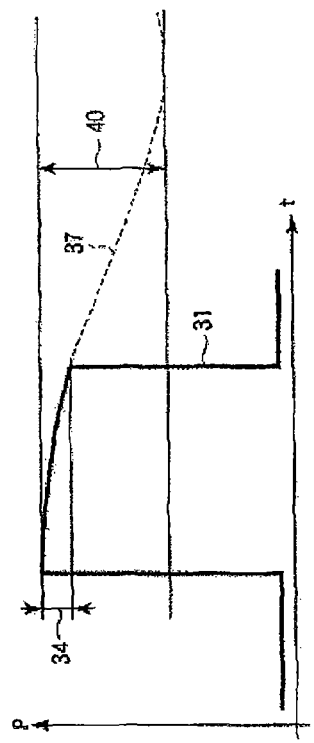
FIG. 3C is an image view illustrating a change in phase cycle of an interference wave in the process of matching the optical line lengths of the dualized lines illustrated in FIG. 1. The image is a view illustrating a case in which an optical line difference ΔL is nearly matched.

In light of the fact, in the present disclosure, as illustrated in FIG. 3C, optical line length adjustment has been performed by lengthening the phase cycle of the interference waveform occurring on the top floor of the multiplexed pulse light 31 as much as possible (to be longer than at least a half cycle) and approximating the top floor to the straight line. Approximating to the straight line is the same as minimizing the width between the upper limit and the lower limit and thus matching the optical line lengths of the dualized lines.

Another optical line difference detection method (2) will be described.

Figure 4A:
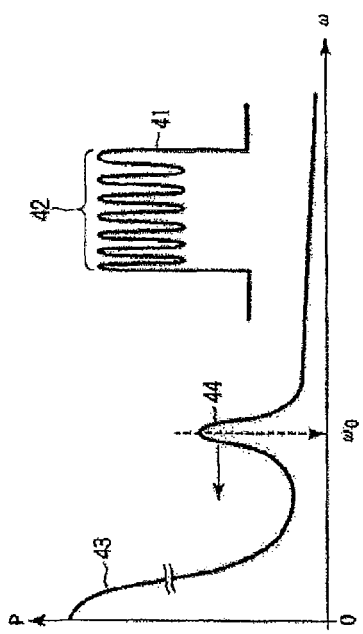
FIG. 4A is an image view illustrating a change in frequency spectrum of an interference waveform in the process of matching the optical line lengths of the dualized lines illustrated in FIG. 1. The image is a view illustrating a case in which an optical line difference ΔL is large.
Figure 4B:
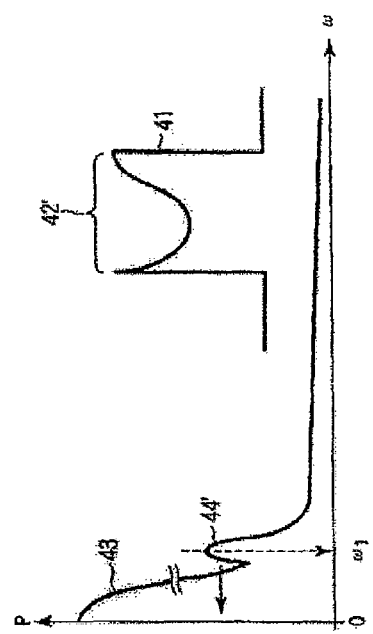
FIG. 4B is an image view illustrating a change in frequency spectrum of an interference waveform in the process of matching the optical line lengths of the dualized lines illustrated in FIG. 1. The image is a view illustrating a case in which an optical line difference ΔL is being reduced.
Figure 4C:
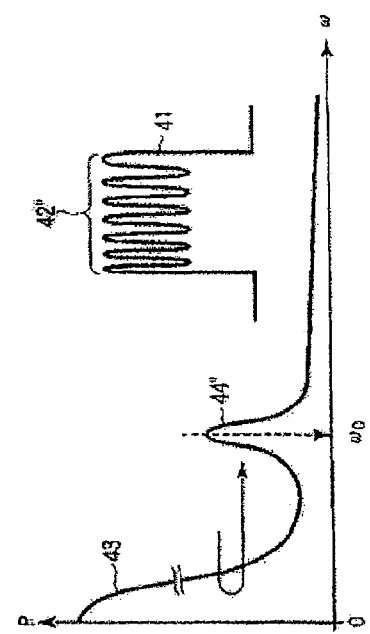
FIG. 4C is an image view illustrating a change in frequency spectrum of an interference waveform in the process of matching the optical line lengths of the dualized lines illustrated in FIG. 1. The image is a view illustrating a case in which an optical line difference ΔL is further reduced, and so an optical line difference of dualized lines is reversed.

FIG. 4 is an image illustrating a change in frequency spectrum of the interference waveform in the process of matching the optical line lengths of the dualized lines. In FIG. 4, 41 represents multiplexed pulse light, 42, 42', and 42" represent the interference waveform, 43 represents a DC component, 44 represents a frequency $\omega_0$ of the interference waveform after an arrival time of chirped pulse light propagated along the in-service line 11 is matched with an arrival time of chirped pulse light propagated along the detour line 12, 44' represents an aspect $\omega_1$ in which the interference waveform changes to frequency zero by optical line length adjustment, and 44" represents an aspect when the frequency of the interference waveform changes to a zero side by optical line length adjustment and then returns to $\omega_0$ again. As illustrated in FIG. 4, when the optical line difference $\Delta L$ increases, the phase cycle of the multiplexed pulse light 41 decreases, and the frequency $\omega_0$ that is present at a high frequency side is observed (FIG. 4A). Next, the phase cycle of the multiplexed pulse light 41 increases, and the frequency spectrum moves from in a zero direction (FIG. 4B) when the optical line difference $\Delta L$ decreases. $\omega_1$ is one which represents an intermediate step of moving to the frequency zero. Further, when the optical line difference $\Delta L$ continually decreases, the frequency $\omega_1$ that is moving is absorbed into the DC component 43, and the frequency spectrum is observed near the initial $\omega_0$ by movement like regression (FIG. 4C).

In order to judge whether or not the optical line lengths have been matched based on the change of the frequency spectrum, as described in "a principle of detecting an optical line difference by optical interference," it is necessary to detect the position that the AC component disappears from the interference waveform, that is, the position of a DC component at which the frequency becomes zero. However, as can be seen in Formula (4), the current value I of the interference waveform contains another DC component such as $|A|^2$ or $|B|^2$, and so it is difficult to discriminate it from the frequency zero (the DC component) obtained when the phase cycle of the interference waveform increases. Thus, a point of the frequency zero (the DC component), that is, a point at which the optical line length of the in-service line 11 becomes equal to the optical line length of the detour line 12 can indirectly be obtained by a method described below.

In connection with the optical line difference $\Delta L$, there are two states: a case in which the detour line 12 is longer than the in-service line 11 ($+\Delta L$); and a case in which the detour line 12 is shorter than the in-service line 11 ($-\Delta L$). On the two states, if pulse lights in which the optical frequency is linearly chirped are multiplexed, interference waveforms having the same phase cycle can be obtained. That is, the same frequency spectrum can be observed at the position of $\pm\Delta L$. This is because since the chirped optical frequency is linear, if a chirped amount (a gradient) at this time is assumed as $\Omega$ (a constant), a frequency difference $\Delta\omega(L)$ between the optical line lengths of the in-service line 11 and the detour line 12 is in proportion to the optical line difference $\Delta L$. That is, it is obtained by the following Formula (5).

$$\Delta\omega(L)=\Omega\cdot|\Delta L|(\text{constant}) \quad (5),$$

where $|\Delta L|$ represents an optical line length difference in the two states of the detour line 12 on the in-service line 11, and the frequency of the interference waveform is observed as the same $\Omega\cdot|\Delta L|$.

Thus, it can be understood that a point at which the optical line length of the in-service line 11 becomes equal to the optical line length of the detour line 12 is at a middle point of the two states ($\pm\Delta L$).

That is, the frequency $\omega_0$ as a reference is first decided, and an optical line length adjustment position $X_1$ corresponding thereto is measured. The optical line length adjuster 17 is adjusted in a frequency zero direction, and the optical line length adjuster 17 moves until the spectrum is detected in the frequency component $\omega_0$ as the reference, and a position $X_2$ of the optical line length adjuster 17 corresponding thereto is measured. Since the two $\omega_0$ s are at the same distance from a position $X_3$ of the frequency zero, the position $X_3$ is obtained by Formula (6).

$$X_3=(X_1+X_2)/2 \quad (6)$$

According to the present method, as compared to the method of minimizing the width between the upper limit and the lower limit of the interference waveform top floor described in the "optical line difference detection method (1)", a direction of eliminating the optical line difference becomes immediately obvious from the change of the frequency spectrum. Further, there is a merit capable of specifying nearly without being affected by the size of the amplitude of the interference waveforms 42, 42', and 42."

Hereinafter, embodiments of the present disclosure based on the above described method will be described in detail.

First Embodiment

Figure 5:
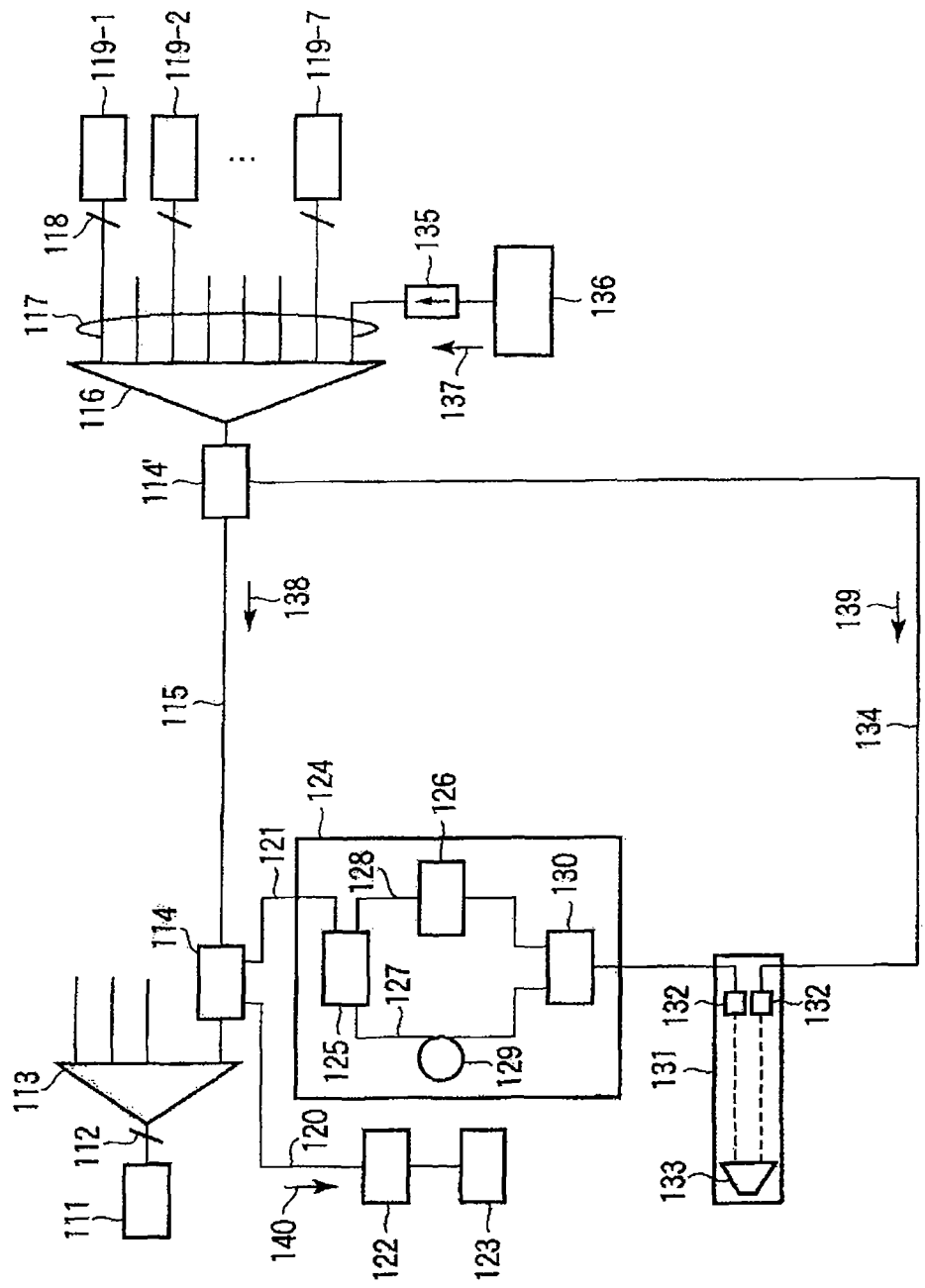
FIG. 5 is a block diagram illustrating a configuration of an optical communication switching system according to a first embodiment of the present disclosure.

FIG. 5 is a block diagram illustrating a configuration of an optical communication switching system according to a first embodiment of the present disclosure. In FIG. 5, 111 represents an indoor transmission device, 112 represents a test light blocking filter, 113 represents a first splitter, 114 and 114' represent detour line connection optical couplers, 115 represents a first branched line (in-service), 116 represents a second splitter, 117 represents a second branched line, 118 represents a test light blocking filter, 119-1 to 119-7 represent an outdoor termination device, 120 represents a measurement port, 121 represents a detour line connection port, 122 represents an optical transmission signal blocking filter, 123 represents an optical oscilloscope, 124 represents an optical transmission signal/test optical multiplexer/demultiplexer, 125 represents a WDM optical coupler, 126 represents an optical switch, 127 represents a test optical path, 128 represents an optical transmission signal path, 129 represents an optical line length adjustment fiber, 130 represents a wavelength independent coupler (WIC) optical coupler, 131 represents a ESO device, 132 represents a transceiving terminal, 133 represents a reflector, 134 represents a detour line, 135 represents an optical isolator, 136 represents a chirped light source (a test light source) used for the detection of the optical line difference, 137 represents chirped pulse light that is test light, 138 represents in-service side chirped pulse light that passes through the first branched line 115, 139 represents a detour side chirped pulse light that passes through the detour line 134, and 140 represents multiplexed pulse light of the chirped pulse lights.

By dividing one optical fiber into a plurality of first branched lines (in-service) 115 (for example, 4 branched lines) by the first splitter 113 and further dividing each of the branched lines 115 into a plurality of second branched lines 117 (for example, 8 branched lines) by the second splitter 116, a passive optical network (PON) system in which one indoor transmission device 111 controls a plurality of (32) outdoor termination devices 119-1 to 119-7 is configured.

In this system, when a work on the first branched line (in-service) 115 is performed, the detour line 134 is connected through the detour line connection optical couplers 114 and 114' that are previously installed at both ends of the first branched line (in-service) 115, so that a communication route is changed to another communication route.

In the detour line 134, the optical switch 126 is disposed in the optical transmission signal/test optical multiplexer/demultiplexer 124 so that an optical transmission signal that has passed through the detour line connection optical couplers 114 and 114' directly after the line 134 has been connected is not dualized with an optical transmission signal from the first branched line (in-service) 115 with the signal phase difference. In the optical transmission signal/test optical multiplexer/demultiplexer 124, separately from the optical transmission signal path 128, the test optical path 127 that continuously passes the detour side chirped pulse light 139 for a test in order to detect the optical line difference between the first branched line (in-service) 115 and the detour line 134 is configured with the WDM optical coupler 125 and the WIC optical coupler 130. The optical line length adjustment fiber 129 is used to make equal the optical line lengths of the optical transmission signal path 128 and the test optical path 127 in the optical transmission signal/test optical multiplexer/demultiplexer 124.

The chirped pulse light source 136 is installed, for example, in an empty core wire of the second branched line 117 and outputs the chirped pulse light 137. As the chirped light source, a distributed feedback laser diode (DFB-LD) that is relatively narrow in line width is preferably used, and an optical pulse tester that performs direct intensity modulation may be used.

The transmitted chirped pulse light 137 is branched into the in-service side chirped pulse light 138 and the detour side chirped pulse light 139 by the detour line connection optical coupler 114', multiplexed by the detour line connection optical coupler 114 again, passes through the optical transmission signal blocking filter 122 through the measurement port 120, and measured as the multiplexed pulse light 140 by the optical oscilloscope 123.

The FSO device 131 is a spatial length adjuster for compensating for the optical line difference between the first branched line (in-service) 115 and the detour line 134. The FSO device 131 includes a fixed transceiving unit 132 having a collimator function and a movable reflector 133. The spatial optical line length is extended or contracted by moving the reflector 133.

The test light blocking filters 112 and 118 block the chirped pulse light 137 of the test wavelength so that optical line difference detection measurement can be performed even during provision of a service. On the contrary, the optical transmission signal blocking filter 122 and the optical isolator 135 block the optical transmission signal from being input to the optical oscilloscope 123 at the time of optical line difference detection.

Figure 6:
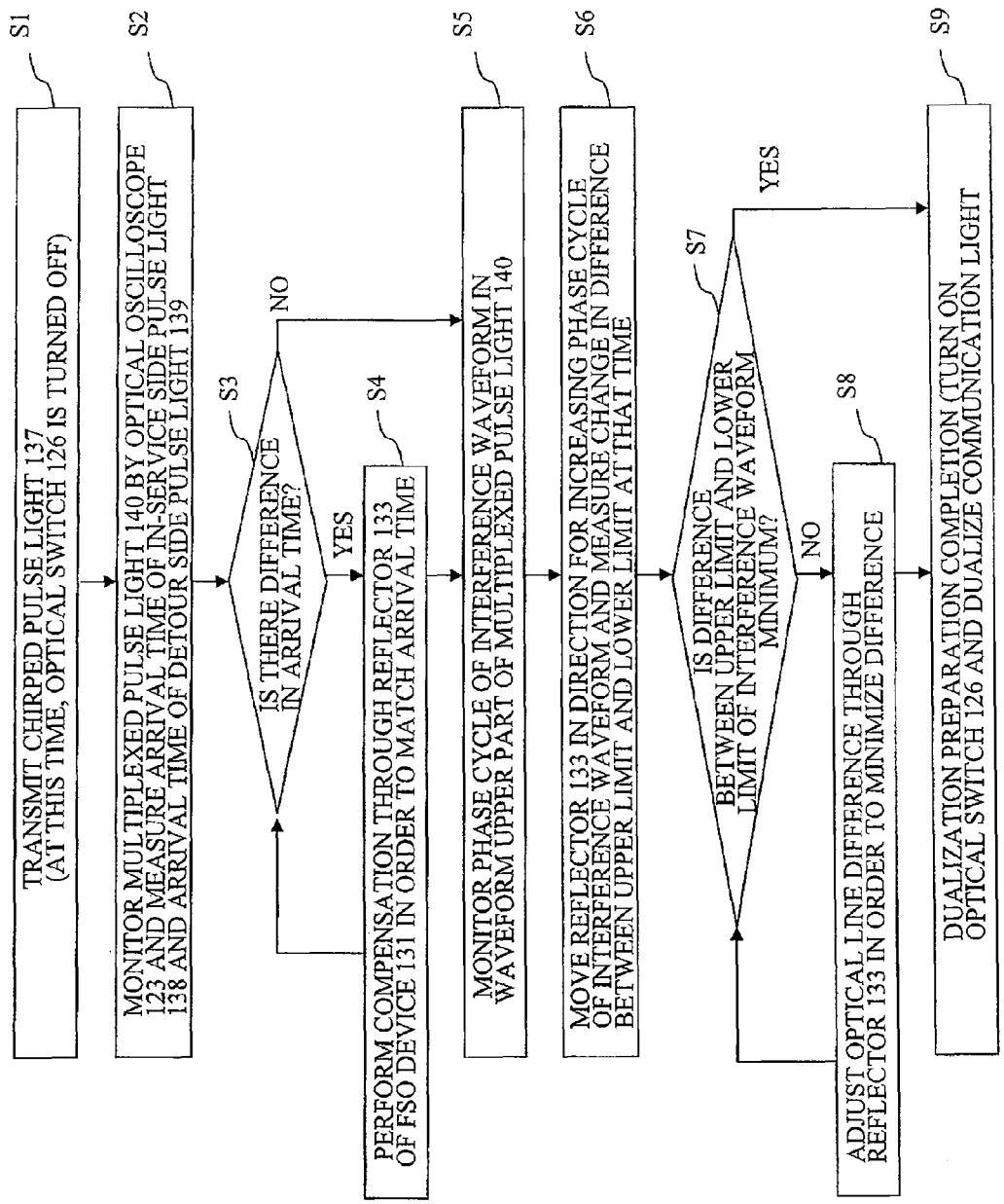
FIG. 6 is a flowchart illustrating an adjustment procedure of matching an optical line length of a detour line on a first branched line (in-service) in the first embodiment.

Next, an adjustment procedure of adjusting the optical line length of the detour line 134 with respect to the first branched line (in-service) 115 will be described with reference to a flowchart illustrated in FIG. 6.

First, the chirped pulse light 137 is transmitted from the chirped pulse light source 136 (step S1). At this time, the optical switch 126 is turned off to block the optical transmission signal so that the optical transmission signal propagated through the detour line 134 is not superimposed on the optical transmission signal of the first branched line (in-service) 115.

Next, the multiplexed pulse light 140 that has been propagated along the first branched line (in-service) 115 and the detour line 134 and converged by the detour line connection optical coupler 114 again is monitored by the optical oscilloscope 123, and an arrival time of the in-service side chirped pulse light 138 and an arrival time of the detour side chirped pulse light 139 at that time are measured (step S2). If there is a difference between the arrival time, compensation is performed by the reflector 133 of the FSO device 131 to match the arrival times (step S3 and step S4). At this time, a degree of accuracy of optical line length adjustment predominantly depends on the sampling resolution of the optical oscilloscope 123, but since it also greatly depends on a device noise of the optical oscilloscope 123, a degree of deterioration of a chirped pulse light waveform, or stability of optical power, several meters to several tens of centimeters is generally a limit.

Subsequently, in order to further adjust the optical line length, the phase cycle of the interference waveform that is being generated in an upper part of the multiplexed pulse light 140 is monitored (step S5). The reflector 133 moves in a direction for increasing the phase cycle of the interference waveform, and a difference between an upper limit and a lower limit at this time is measured (step S6). The reflector 133 is adjusted so that the measured difference between the upper limit and the lower limit can be minimized (step S7 and step S8). A degree of accuracy of optical line length adjustment at this time is a millimeter order including a degree of adjustment accuracy of the reflector 133.

Thus, when the first branched line (in-service) 115 and the detour line 134 are matched with the millimeter (mm) order through the optical line length adjustment procedure, the optical switch 126 is turned on, and the optical transmission signal is dualized (step S9).

FIGS. 7 and 8 illustrate a verification result when the optical line length adjustment procedure is performed.

FIG. 7 is an experimental example of optical line length adjustment through chirped pulse light arrival time difference measurement. A represents the detour side chirped pulse waveform, and B represents the in-service side chirped pulse waveform. In FIG. 7, (A) illustrates a result of monitoring the multiplexed pulse light 140, which has been propagated along the first branched line (in-service) 115 and the detour line 134 and converged by the detour line connection optical coupler 114 again, through the optical oscilloscope 123 and measuring the arrival time of the in-service side chirped pulse light 138 and the arrival time of the detour side chirped pulse light 139 at that time as in step S2. The optical line difference is about 99 meters.

Figure 7A:
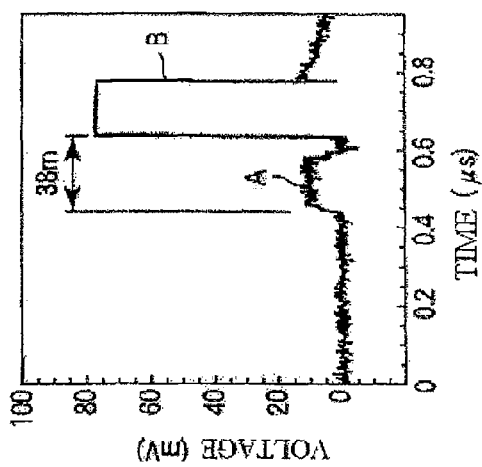
FIG. 7A is a waveform view illustrating an experimental example of optical line length adjustment through chirped pulse light arrival time difference measurement according to the first embodiment.
Figure 7B:
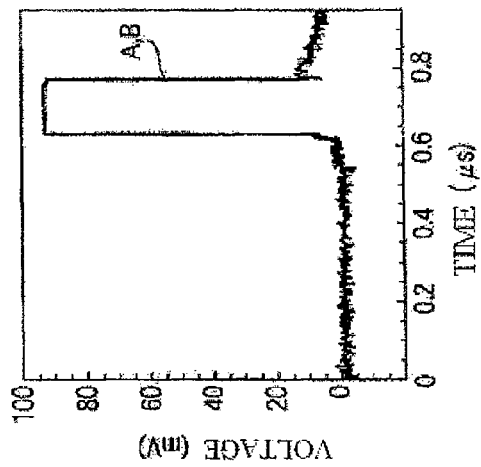
FIG. 7B is a waveform view illustrating an experimental example of optical line length adjustment through chirped pulse light arrival time difference measurement according to the first embodiment.
Figure 7C:
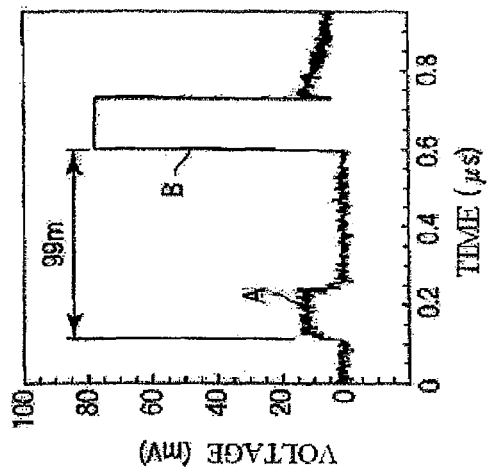
FIG. 7C is a waveform view illustrating an experimental example of optical line length adjustment through chirped pulse light arrival time difference measurement according the first embodiment.
Figure 7D:
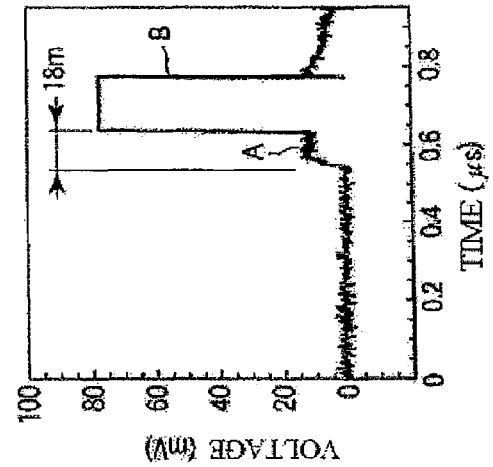
FIG. 7D is a waveform view illustrating an experimental example of optical line length adjustment through chirped pulse light arrival time difference measurement according to the first embodiment.

Next, FIG. 7B to 7D illustrate an aspect in which compensation for matching the arrival time is performed by the reflector 133 of the FSO device 131. In FIG. 7B, the optical line difference is reduced to 38 m, in FIG. 7C, the optical line difference is reduced to 18 m, and in FIG. 7D, the optical line difference is reduced to several meters, but it is difficult to obtain a higher degree of distance accuracy.

Figure 8A:
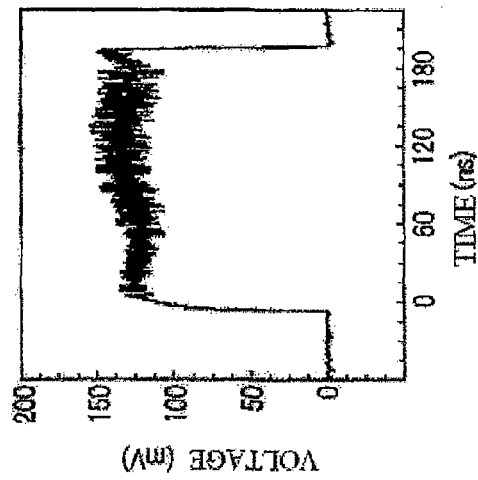
FIG. 8A is a waveform view illustrating an experimental example of optical line length adjustment through measurement of optical interference in an upper part of multiplexed pulse light according to the first embodiment.
Figure 8B:
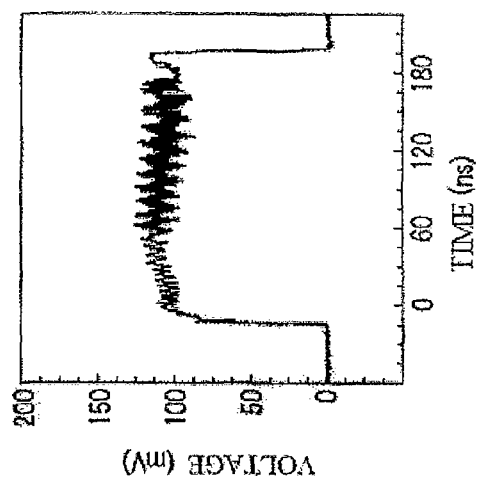
FIG. 8B is a waveform view illustrating an experimental example of optical line length adjustment through measurement of optical interference in an upper part of multiplexed pulse light according to the first embodiment.
Figure 8C:
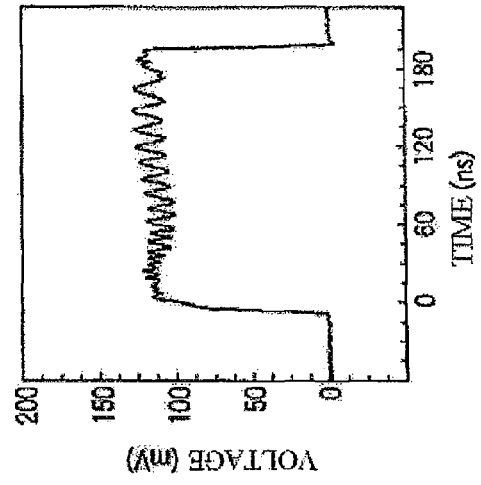
FIG. 8C is a waveform view illustrating an experimental example of optical line length adjustment through measurement of optical interference in an upper part of multiplexed pulse light according to the first embodiment.
Figure 8D:
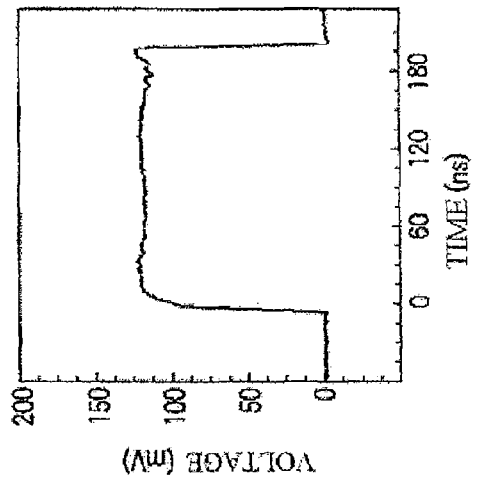
FIG. 8D is a waveform view illustrating an experimental example of optical line length adjustment through measurement of optical interference in an upper part of multiplexed pulse light according to the first embodiment.

Thus, focusing on the interference waveform generated in the upper part of the multiplexed pulse light 140 of FIG. 7D, the phase cycle is first monitored (step S5). The reflector 133 moves in a direction for increasing the phase cycle of the interference waveform, and a difference between an upper limit and a lower limit at this time is measured (step S6). The reflector 133 is adjusted so that the measured difference between the upper limit and the lower limit can be minimized (step S7 and step S8). FIG. 8 illustrates a result of performing optical line difference adjustment as in step S5 to step S8. FIG. 8A illustrates an interference waveform in which an optical line difference is several tens of centimeters (cm), FIG. 8B illustrates an interference waveform in which an optical line difference is ten and several centimeters (cm), FIG. 8C illustrates an interference waveform in which an optical line difference is several centimeters (cm), and FIG. 8D illustrates an interference waveform in which an optical line difference is several millimeters (mm). It has been possible to confirm an aspect in which as the optical line difference decreases, the phase cycle of the interference waveform increases, and finally the interference waveform disappears.

Figure 9:
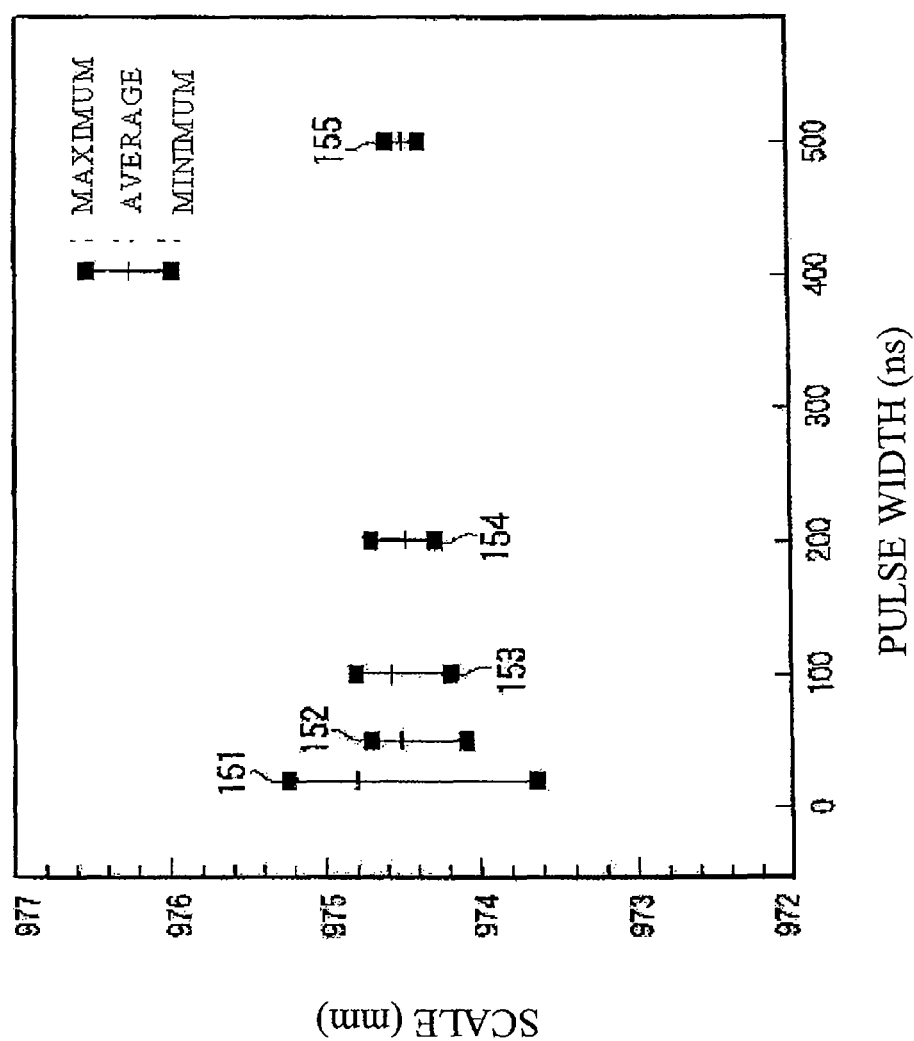
FIG. 9 is a view illustrating a relationship between a chirped pulse width and a FSO rail guide scale when an optical line length is matched (a difference between an upper limit and a lower limit of an interference waveform is minimum) according to the first embodiment.

FIG. 9 illustrates a relationship between a chirped pulse width and a FSO rail guide scale when the optical line length is matched (the difference between the upper limit and the lower limit of the interference waveform is minimum). In FIG. 9, 151 represents the position of the FSO rail guide scale when the pulse width is 20 ns, 152 represents the position of the FSO rail guide scale when the pulse width is 50 ns, 153 represents the position of the FSO rail guide scale when the pulse width is 100 ns, 154 represents the position of the FSO rail guide scale when the pulse width is 200 ns, and 155 represents the position of the FSO rail guide scale when the pulse width is 500 ns. A measurement has been performed on each pulse width four times, and a maximum, a minimum, and an average thereof have been illustrated. It can be confirmed in FIG. 9 that the other pulse widths (152 to 155) excluding the pulse width 20 ns (151) remains in a degree of distance accuracy within a range between 974 mm and 975 mm of the FSO rail guide scale, that is, within 1 mm. The reason why the degree of distance accuracy of the pulse width 20 ns (151) is higher than that of the other pulse widths is because the pulse shape is close to a triangular waveform and so the top floor part is narrow, a measurement error increases when obtaining a minimum value of the difference between the upper limit and the lower limit.

Second Embodiment

Figure 10:
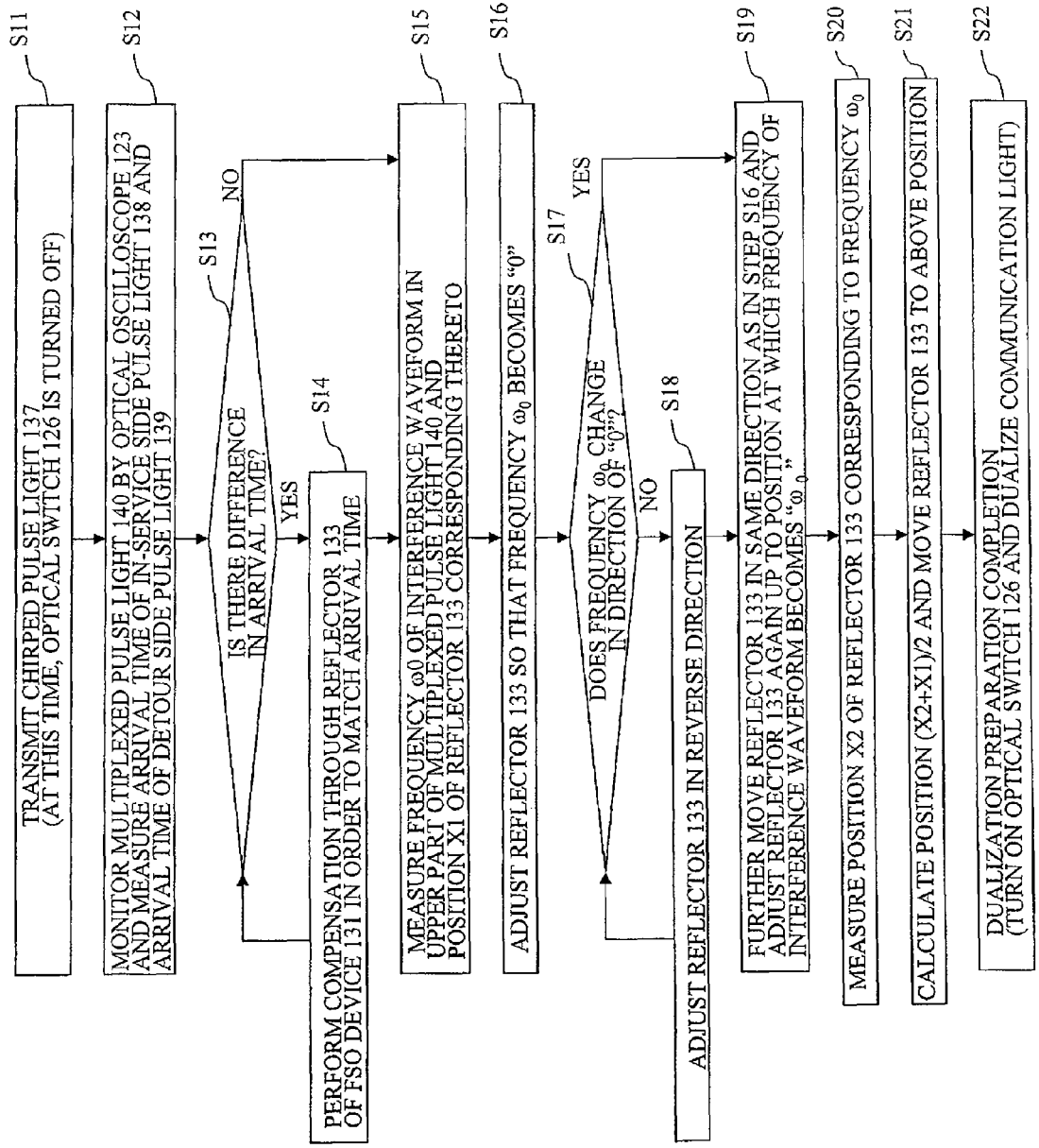
FIG. 10 is a flowchart illustrating an adjustment procedure of optical line difference adjustment in an optical communication switching system according to a second embodiment of the present disclosure.

In the present embodiment, an optical line difference adjustment procedure is the same as in the first embodiment except that the phase cycle of the interference waveform in the upper part of the multiplexed pulse light 140 is Fourier-transformed, and the optical line difference is detected based on the frequency spectrum. Thus, an adjustment procedure of optical line difference adjustment according to a second embodiment will be described using FIG. 10 with reference to the configuration diagram illustrated in FIG. 5.

First, the chirped pulse light 137 is transmitted from the chirped pulse light source 136 (step S11). At this time, the optical switch 126 is turned off to block the optical transmission signal so that the optical transmission signal propagated through the detour line 134 is not superimposed on the optical transmission signal of the first branched line (in-service) 115.

Next, the multiplexed pulse light 140 that has been propagated along the first branched line (in-service) 115 and the detour line 134 and converged by the detour line connection optical coupler 114 again is monitored by the optical oscilloscope 123, and an arrival time of the in-service side chirped pulse light 138 and an arrival time of the detour side chirped pulse light 139 at that time are measured (step S12). If there is a difference between the arrival times, compensation is performed by the reflector 133 of the FSO device 131 to match the arrival times (step S13 and step S14). At this time, a degree of accuracy of optical line length adjustment predominantly depends on the sampling resolution of the optical oscilloscope 123, but since it also greatly depends on a device noise of the optical oscilloscope 123, a degree of deterioration of a pulse light waveform, or stability of optical power, several meters to several tens of centimeters is generally a limit.

Subsequently, in order to further adjust the optical line length, the frequency spectrum $\omega_0$ of the interference waveform that is being generated in the upper part of the multiplexed pulse light 140 and the position $X_1$ of the reflector 133 corresponding thereto are measured (step S15). The reflector 133 moves in a direction in which the frequency spectrum $\omega_0$ of the interference waveform becomes zero (step S16). At this time, when the frequency spectrum $\omega_0$ has moved in a direction other than zero, the reflector 133 moves in a reverse direction (step S17 and step S18). However, when the frequency spectrum $\omega_0$ has moved to zero, the reflector 133 continuously moves further and continuously moves again up to the position at which the frequency spectrum of the interference waveform is $\omega_0$ (step S19). The position $X_2$ of the reflector 133 corresponding to the frequency spectrum $\omega_0$ is measured (step S20). Then, the position $(X_1+X_2)/2$ is calculated, and the reflector 133 is set at the calculated position (step S21).

Thus, when the first branched line (in-service) 115 and the detour line 134 are matched through the optical line length adjustment procedure, the optical switch 126 is turned on, and the optical transmission signal is dualized (step S22). A degree of accuracy of optical line length adjustment at this time is a millimeter (mm) order including a degree of adjustment accuracy of the reflector 133.

The "optical line difference adjustment procedure" is verified with reference to FIGS. 8, 10, 11, and 2.

In the present embodiment, the optical line difference adjustment procedure is the same as in the first embodiment except that the optical line difference is detected by transforming the change of the phase cycle of the interference waveform in the upper part of the multiplexed pulse light 140 to the frequency change.

Figure 11:
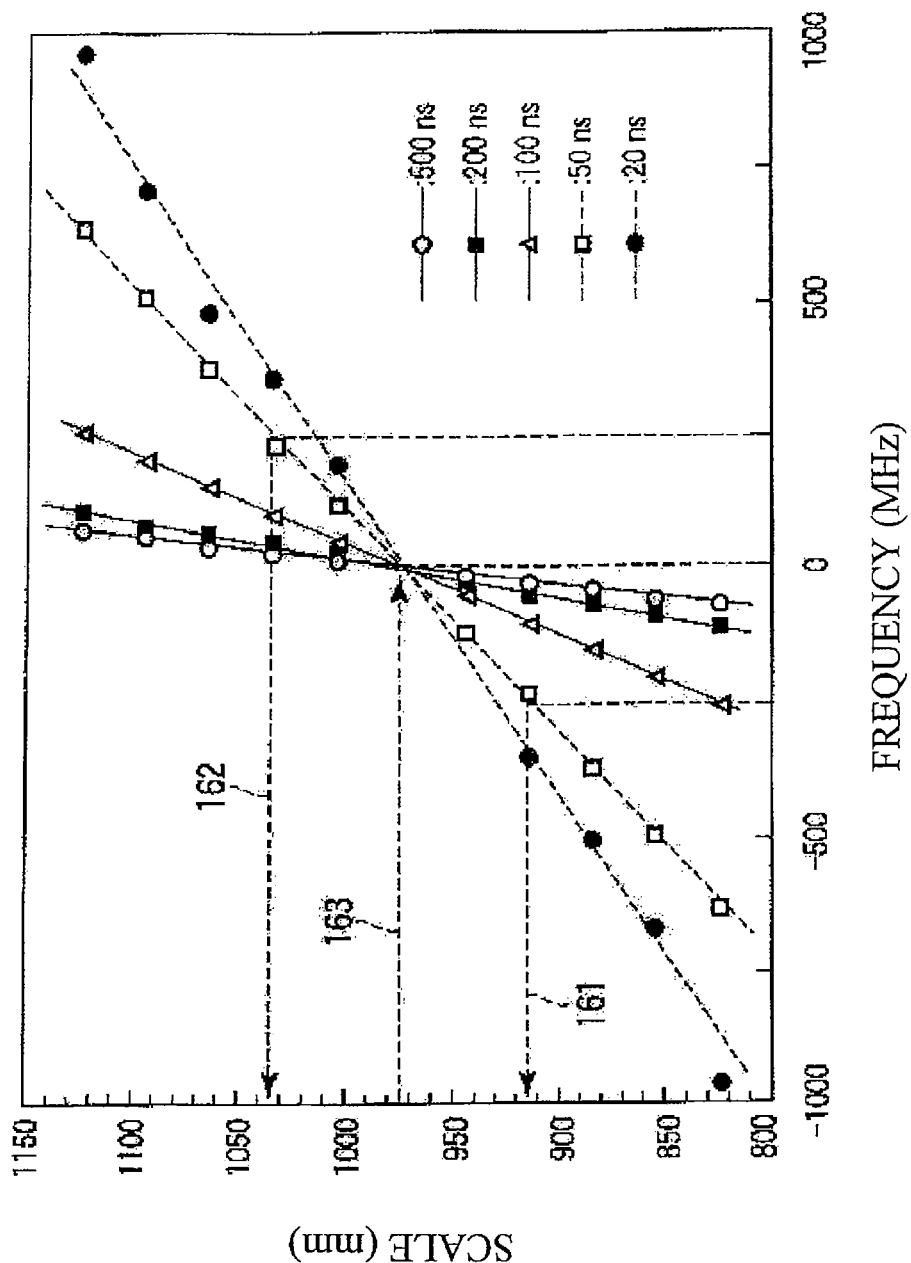
FIG. 11 is a view illustrating a relationship between a frequency spectrum obtained by a chirped pulse light source used in the present disclosure and a FSO rail guide scale.

FIG. 11 illustrates a relationship between a frequency spectrum obtained by a chirped pulse light source used in the present disclosure and a FSO rail guide scale. In FIG. 11, 161 represents a relationship of a frequency and a rail guide scale in step S15 of FIG. 10 when a pulse width of 50 ns is used, 162 represents a relationship of a frequency and a rail guide scale in step S19 of FIG. 10 when the same pulse width is used, and 163 represents a relationship of a frequency and a rail guide scale in step S21 of FIG. 10 when the same pulse width is used.

First, in step S15, the frequency spectrum $\omega_0$ of the interference waveform generated in the upper part of the multiplexed pulse light 140 was −250 MHz, and the position $X_1$ of the reflector 133 at that time was 913 mm.

Next, in step S17 and step S18, the reflector 133 has moved in a direction in which the frequency spectrum −250 MHz of the interference waveform becomes zero. The reflector 133 has continuously moved further and has continuously moved again up to the position $X_2$ at which the frequency spectrum of the interference waveform is 250 MHz (step S19). At this time, the position $X_2$ of the reflector 133 was 1035 mm (step S20).

Finally, the position $(X_1+X_2)/2$ was calculated, and the reflector 133 was set at the position of 974 mm (step S21).

When the first branched line (in-service) 115 and the detour line 134 are matched through the optical line length adjustment procedure, the optical switch 126 is turned on, and the optical transmission signal is dualized (step S22). The position of the rail guide scale of the optical line difference adjustment reflector obtained by the system of the present embodiment and the position obtained in the first embodiment are matched with a degree of accuracy of the millimeter (mm) order.

Third Embodiment

Figure 12:
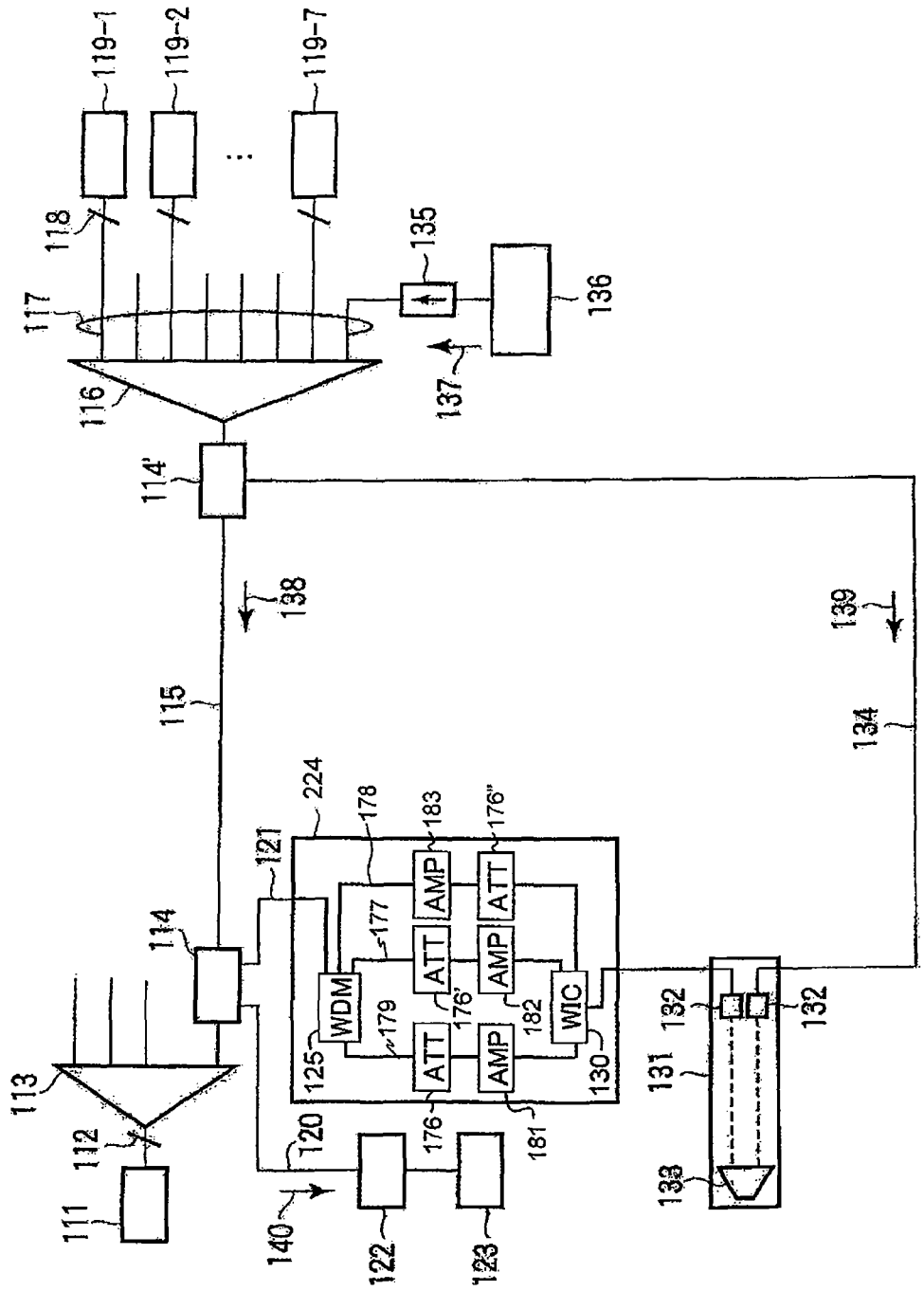
FIG. 12 is a block diagram illustrating a configuration of an optical communication switching system according to a third embodiment of the present disclosure.

FIG. 12 is a block diagram illustrating a configuration of an optical communication switching system according to a third embodiment of the present disclosure. The present optical communication switching system includes an optical transmission signal/test optical multiplexer/demultiplexer 224 instead of the optical transmission signal/test optical multiplexer/demultiplexer 124.

The optical transmission signal/test optical multiplexer/demultiplexer 224 includes a WDM optical coupler 125, a WIC optical coupler 130, an optical attenuator 176, an optical attenuator 176', an optical attenuator 176", a test optical amplifier 181, an uplink optical transmission signal optical amplifier 182, and a downlink optical transmission signal optical amplifier 183. Here, the optical attenuator 176', the optical attenuator 176", the uplink optical transmission signal optical amplifier 182, and the downlink optical transmission signal optical amplifier 183 correspond to the above described level adjustment means.

Figure 13:
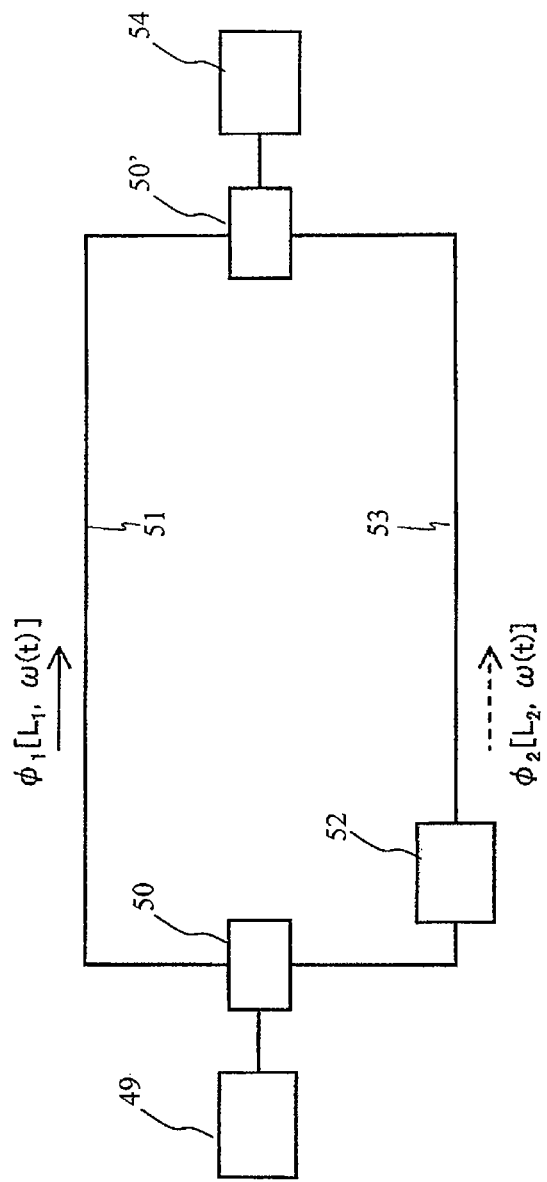
FIG. 13 is an image view of an optical transmission signal propagated along dualized lines.

First, bit interference noise reduction in a dualized line switching system will be described with reference to FIGS. 13 and 14. FIG. 13 is an image view of an optical transmission signal propagated along the dualized lines. In FIG. 13, 49 represents an indoor transmission device, 50 and 50' represent optical couplers, 51 represents a first optical transmission line (an in-service line), 52 represents an optical level adjuster, 53 represents a second optical transmission line (a detour line), and 54 represents an outdoor termination device.

As illustrated in FIG. 13, when the optical transmission signal transmitted from the indoor transmission device 49 passes through the dualized lines of the Mach-Zehnder type including the in-service line 51 and the detour line 53, the optical transmission signals that have different optical frequency parts due to the optical line difference $\Delta L$ ($=\Delta t \cdot c/n$) are multiplexed and received by the outdoor termination device 54, accompanied by the bit interference noise of the difference frequency component $\Delta \omega$. Here, $\Delta t$ represents a time difference, c represents the speed of light, and n represents a refractive index of the core of the in-service line 51 and the detour line 53.

Figure 14:
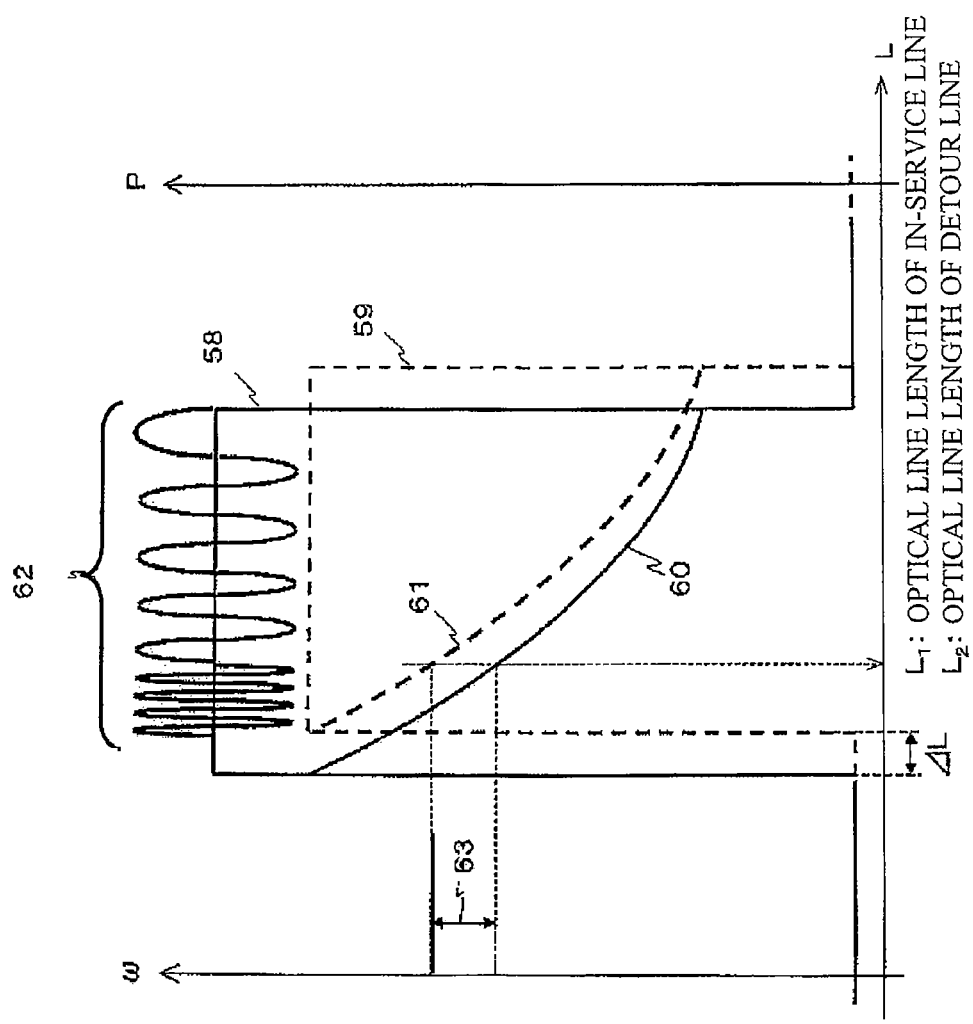
FIG. 14 is an image view of a multiplexed optical transmission signal waveform that accompanies bit interference.

FIG. 14 illustrates an aspect at that time, that is, an image of power, an optical frequency, and a bit interference waveform of each of optical transmission signal bit pulses (one bit) propagated along the dualized line. In FIG. 14, 58 represents a bit pulse of an in-service side optical transmission signal, 59 represents a bit pulse of a detour side optical transmission signal, 60 represents a frequency chirp curve of the in-service side optical transmission signal, 61 represents a frequency chirp curve of the detour side optical transmission signal, 62 represents a bit interference waveform, and 63 represents an optical frequency difference $\Delta \omega$.

Here, if an optical transmission signal $\phi_1$ that is branched by the optical coupler 50 and then propagated along the in-service line 51 and an optical transmission signal $\phi_2$ that is branched by the optical coupler 50 and then propagated along the detour line 53 are approximated by a plane wave, they are expressed by the following Formulas (7) and (8).

$$\phi_1\{L_1,\omega L_1\} = A \cdot \exp\left[-i\{k_0 \cdot n \cdot L_1 - \omega(L_1) \cdot t + \phi_0\}\right] \quad (7)$$

$$\phi_2\{L_2,\omega L_2\} = B \cdot \exp\left[-i\{k_0 \cdot n \cdot L_2 - \omega(L_2) \cdot t + \phi_0\}\right] \quad (8)$$

Here, $L_1$ and $L_2$ represent an optical line length of the in-service line 51 and an optical line length of the detour line 53, respectively. $\omega(L_1)$ and $\omega(L_2)$ represent an optical frequency at the optical line length $L_1$ and an optical frequency at the optical line length $L_2$, respectively. A and B each represents the amplitude, and $k_0$ represents a wavenumber in vacuum. n represents a refractive index of the core, and $\phi_0$ represents an initial phase.

Here, since a current value I measured by the outdoor termination device 54 is in proportion to the square of an interference wave in which the optical transmission signal $\phi_1$ and the optical transmission signal $\phi_2$ are superimposed, the current value I is obtained by Formula (9). Here, it is assumed that optical-electric conversion efficiency is 1, and polarization coupling efficiency at the time of multiplexing is 1 in view of the largest bit interference.

$$I = |\phi_1 + \phi_2^*|^2 \quad (9),$$

where * denotes a complex conjugate. By substituting Formulas (7) and (8) into Formula (9), the following Formula (10) is obtained.

$$I = |A|^2 + |B|^2 \pm 2 \cdot |A| \cdot |B| \cdot \cos(k_0 \cdot n \cdot \Delta L - \Delta \omega \cdot t) \quad (10),$$

where $\Delta L = L_1 - L_2$, and $\Delta \omega = \omega(L_1) - \omega(L_2)$.

As can be seen from FIG. 14, when there is no optical line difference ($\Delta L = 0$), since the frequencies of the optical transmission signals to be multiplexed are the same as each other and so the optical frequency difference 63 $\Delta \omega$ becomes "0," a cosine part of a third term of Formula (10) becomes "1," so that an AC component disappears from the current value I. That is, it is expected that the current value I will become a constant value. However, if it is considered that the length of the optical transmission line is extended or contracted due to an ambient temperature environment or that the frequency of the optical transmission signal source fluctuates even if the optical line difference is completely matched ($\Delta L = 0$), it is realistically impossible to happen that the AC component (a bit interference term) disappears from Formula (10).

Therefore, in the present disclosure, an interference noise reduction countermeasure is taken based on the fact that the bit interference occurs due to a reason such as the optical line difference $\Delta L$. That is, as can be seen in Formula (10), by reducing the amplitude of the third term (the cosine part) representing the bit interference, the interference noise can be suppressed. That is, by setting a level difference to the intensity of the optical transmission signal propagated along the dualized lines, the interference intensity can be reduced.

Figure 15A:
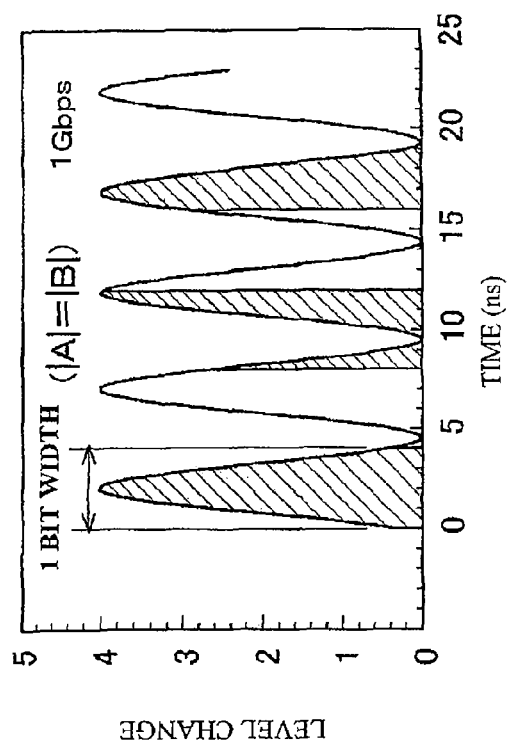
FIG. 15A is a view for explaining an activity status of bit noise of a multiplexed optical transmission signal waveform.
Figure 15B:
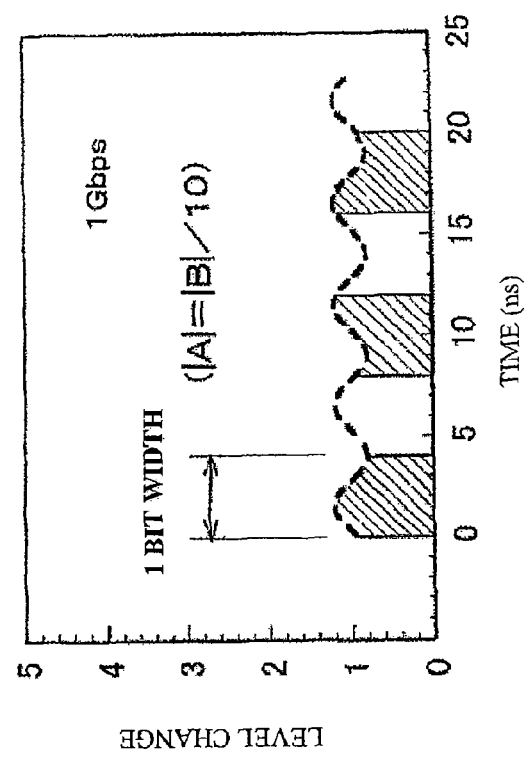
FIG. 15B is a view for explaining an activity status of bit noise of a multiplexed optical transmission signal waveform.

FIG. 15A illustrates occurrence statuses of the bit interference noise in a case FIG. 15A in which the optical transmission signals $\phi_1$ and $\phi_2$ that are propagated along the in-service line 51 and the detour line 53, respectively, have the same amplitude ($|A|=|B|$) and in a case FIG. 15B of 10:1 ($|A|=|B|/10$). Here, the optical frequency difference $\Delta \omega$ between the two optical transmission signals is assumed as 20 MHz. For example, it can be understood that in a case of a GE-PON Gbps), since a signal of a pulse string has a bit width of 4 ns, in the case FIG. 15A in which the amplitudes are the same, an optical level within one bit width abruptly changes, and the bit pulse of the optical transmission signal may be lost in the worst case. However, in the case FIG. 15B in which the amplitude ratio is 10:1, the change is gentle, and so the bit pulse of the optical transmission line is not lost though the level change occurs.

As described above, by setting the level difference to the dualized optical transmission signals, the amplitude that accompanies the bit interference can be reduced.

The optical communication switching system of FIG. 12 will be described in detail. The optical transmission signal/test optical multiplexer/demultiplexer 224 includes three paths of an uplink optical transmission signal path 177, a downlink optical transmission signal path 178, and a test optical path 179 between the WDM optical coupler 125 and the WIC optical coupler 130. On the uplink optical transmission signal path 177, the uplink optical transmission signal optical amplifier 182 and the optical attenuator 176' are disposed toward a transmission direction of an uplink optical transmission signal. On the downlink optical transmission signal path 178, the downlink optical transmission signal optical amplifier 183 and the optical attenuator 176" are disposed toward a transmission direction of a downlink optical transmission signal. On the test optical path 179, the test optical amplifier 181 and the optical attenuator 176 are disposed toward a transmission direction of test light. The optical transmission signal/test optical multiplexer/demultiplexer 224 can adjust optical power of the uplink optical transmission signal, the downlink optical transmission signal, and the test light through the above configuration.

Here, the reduction effect of the bit interference light intensity has been verified such that the optical line length of the first branched line (in-service) 115 and the optical line length of the detour line 134 are matched by the FSO device 131, and in that status, optical power of the uplink and downlink optical transmission signals are controlled by the optical amplifiers 182 and 183 and the optical attenuators 176' and 176".

Figure 16:
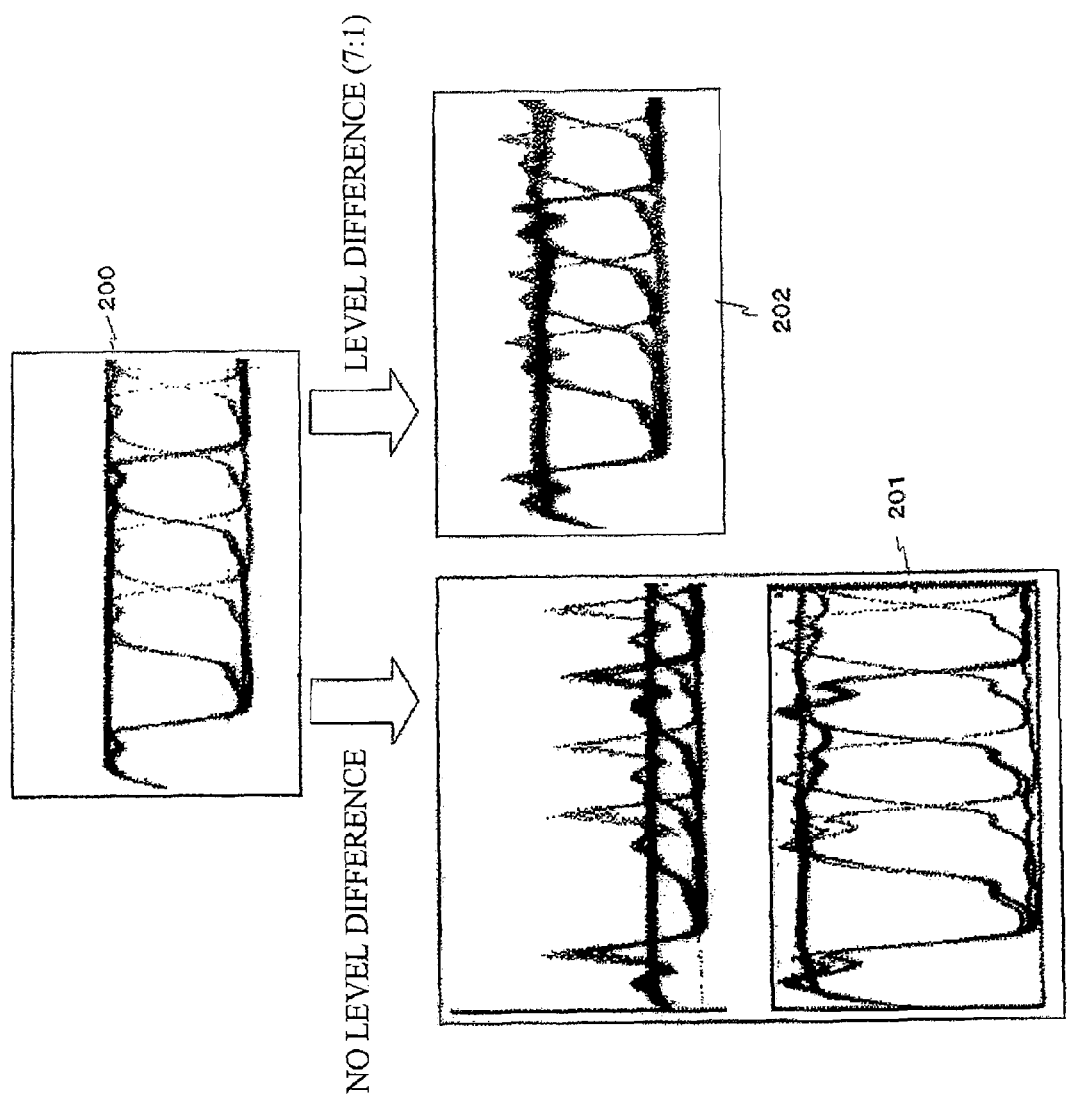
FIG. 16 is a view for explaining a waveform of a downlink optical transmission signal before a countermeasure of the present disclosure is taken and a waveform of a downlink optical transmission signal after a countermeasure of the present disclosure is taken.
Figure 17:
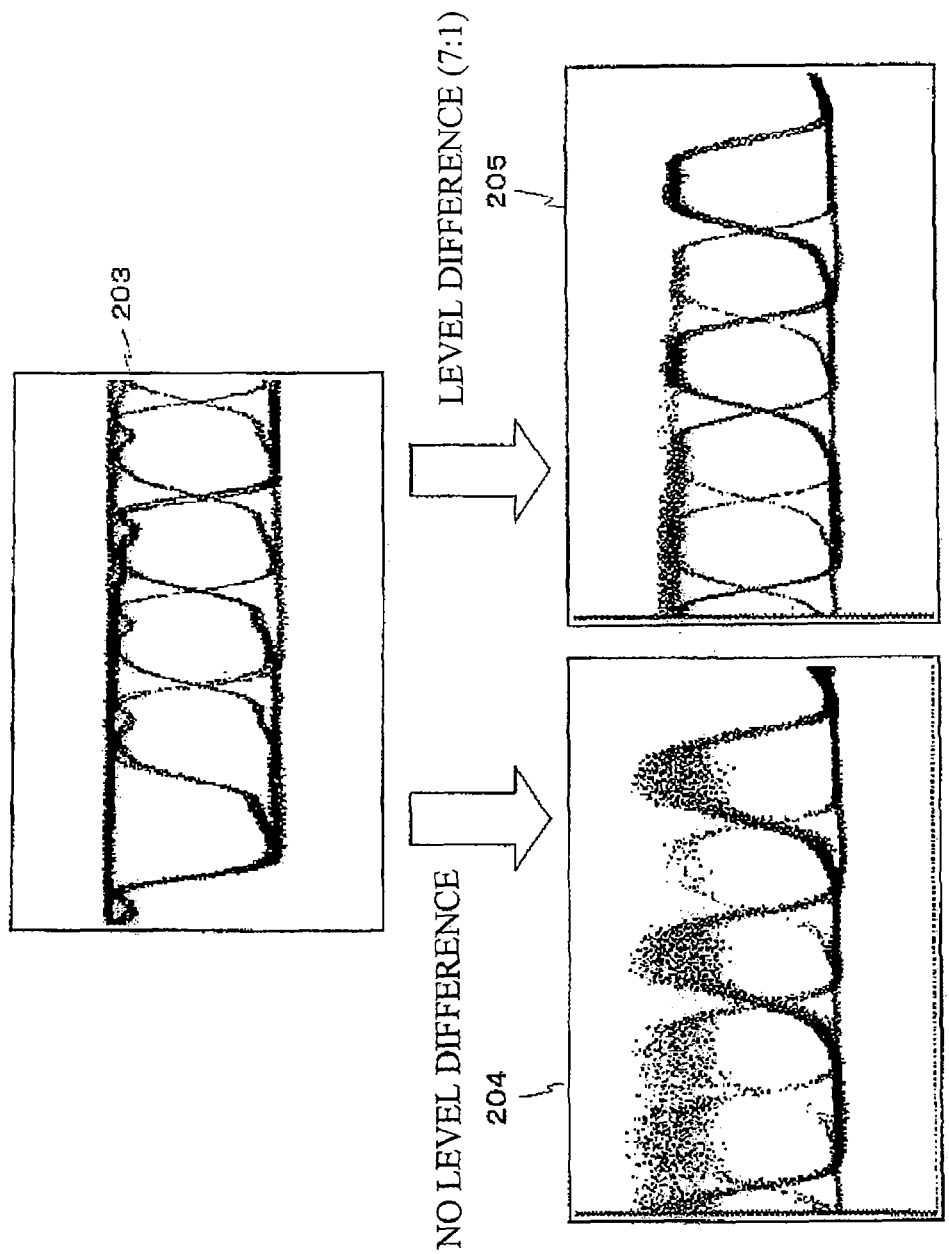
FIG. 17 is a view for explaining a waveform of an uplink optical transmission signal before a countermeasure of the present disclosure is taken and a waveform of an uplink optical transmission signal after a countermeasure of the present disclosure is taken.

First, an eye diagram in a case in which an optical level of the uplink optical transmission signal propagated along the first branched line (in-service) 115 is the same as an optical level of the downlink optical transmission signal propagated along the detour line 134 and an eye diagram in a case in which the optical level of the uplink optical transmission signal is different from the optical level of the downlink optical transmission signal have been measured. The result is illustrated in FIGS. 16 and 17. In FIG. 16, 200 represents an optical transmission signal waveform from a downlink optical transmission signal source (DFB-LD), 201 represents a multiplexed waveform when there is little level difference between the optical transmission signals, 202 represents a multiplexed waveform when there is a level difference of about 7:1 between the optical transmission signals. In FIG. 17, 203 represents an optical transmission signal waveform from an uplink optical transmission signal source (FP-LD), 204 represents a multiplexed waveform when there is little level difference between the optical transmission signals, 205 represents a multiplexed waveform when there is a level difference of about 7:1 between the optical transmission signals. As can be seen from FIGS. 16 and 17, in both cases, when there is a level difference between the optical transmission signals, the bit interference accompanied by dualization is reduced, so that the form of the eye diagram at the time of optical transmission signal source output can be maintained. As a type of a light source used for the uplink and downlink optical transmission signals, the light source of the downlink optical transmission signal is the DFB-LD, and the light source of the uplink optical transmission signal is the FP-LD. For this reason, the former is close to dual-beam interference, and the latter shows a tendency of multi-beam interference.

Figure 18:
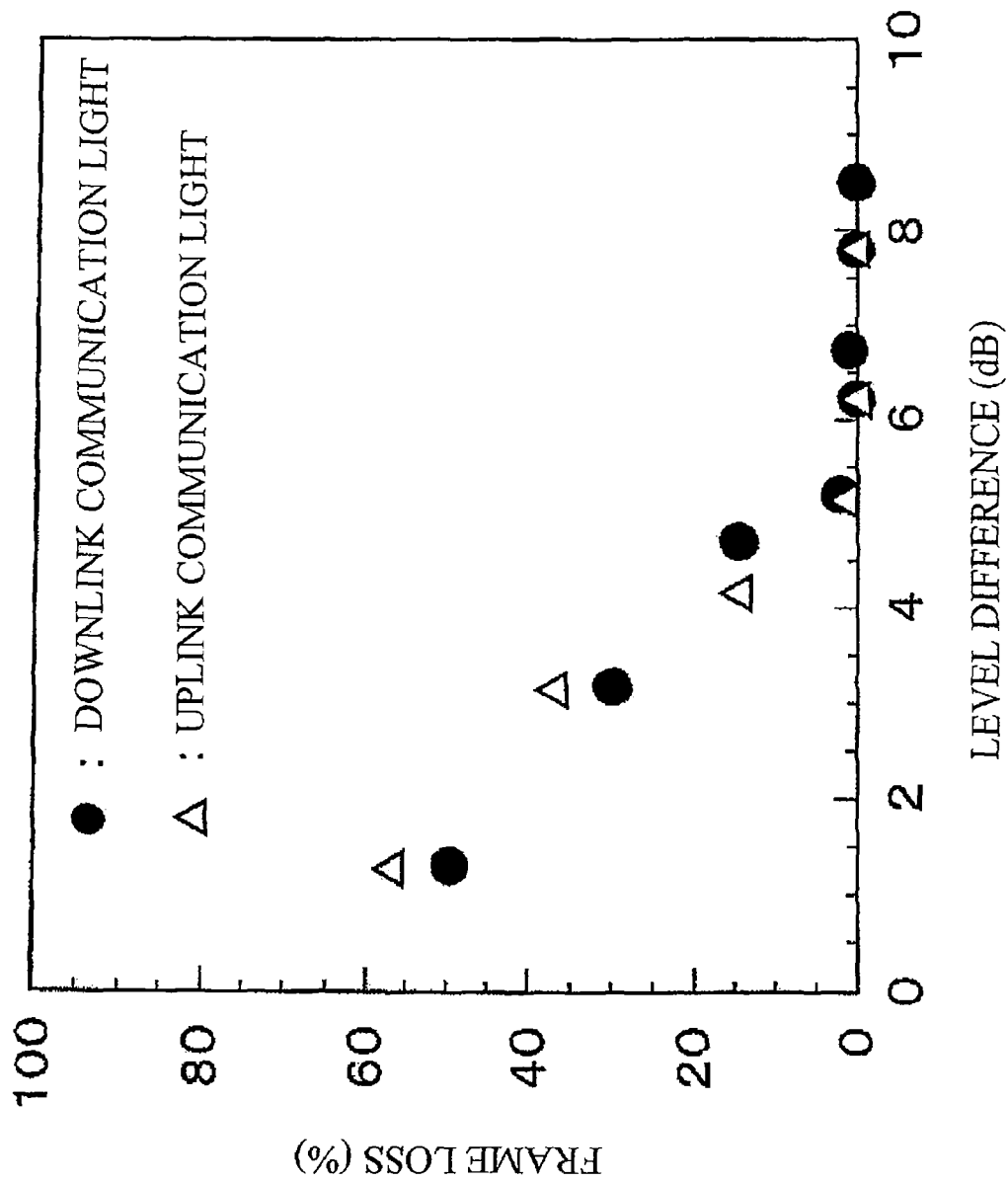
FIG. 18 illustrates a result of measuring a frame loss between an OLT and an ONU while changing a level difference of an optical transmission signal propagated along dualized lines.

Next, a frame loss between an optical line terminal (OLT) and an optical network unit (ONU) has been measured while changing the level difference between the optical transmission signals propagated along the dualized lines. The result is illustrated in FIG. 18. In FIG. 18, a black circle represents a frame loss of the downlink optical transmission signal, and a triangular mark represents a frame loss of the uplink optical transmission signal. By setting a level difference larger than about 6 dB to both sides, the frame loss became nearly zero, and deterioration of the communication quality has been suppressed.

As described above, according to the first to third embodiments, a transmission time difference that occurs due to the optical line difference between the in-service line and the detour line that occurs at the time of optical line switching can be compensated and a interference noise that occurs at the time of dualization of optical transmission signal can be reduced. Thus, a transmission logic link status of an in-service signal can be maintained, and so the in-service signal can be switched from the in-service line to the detour line while continuing communication. Thus, a planned interference relocating work can be performed without being conscious of a service suspension time (time zone) on a plurality of users, and improvement of a service in a single optical communication system and a reduction in construction cost can be expected.

(First Embodiment of FSO Device)

Figure 19:
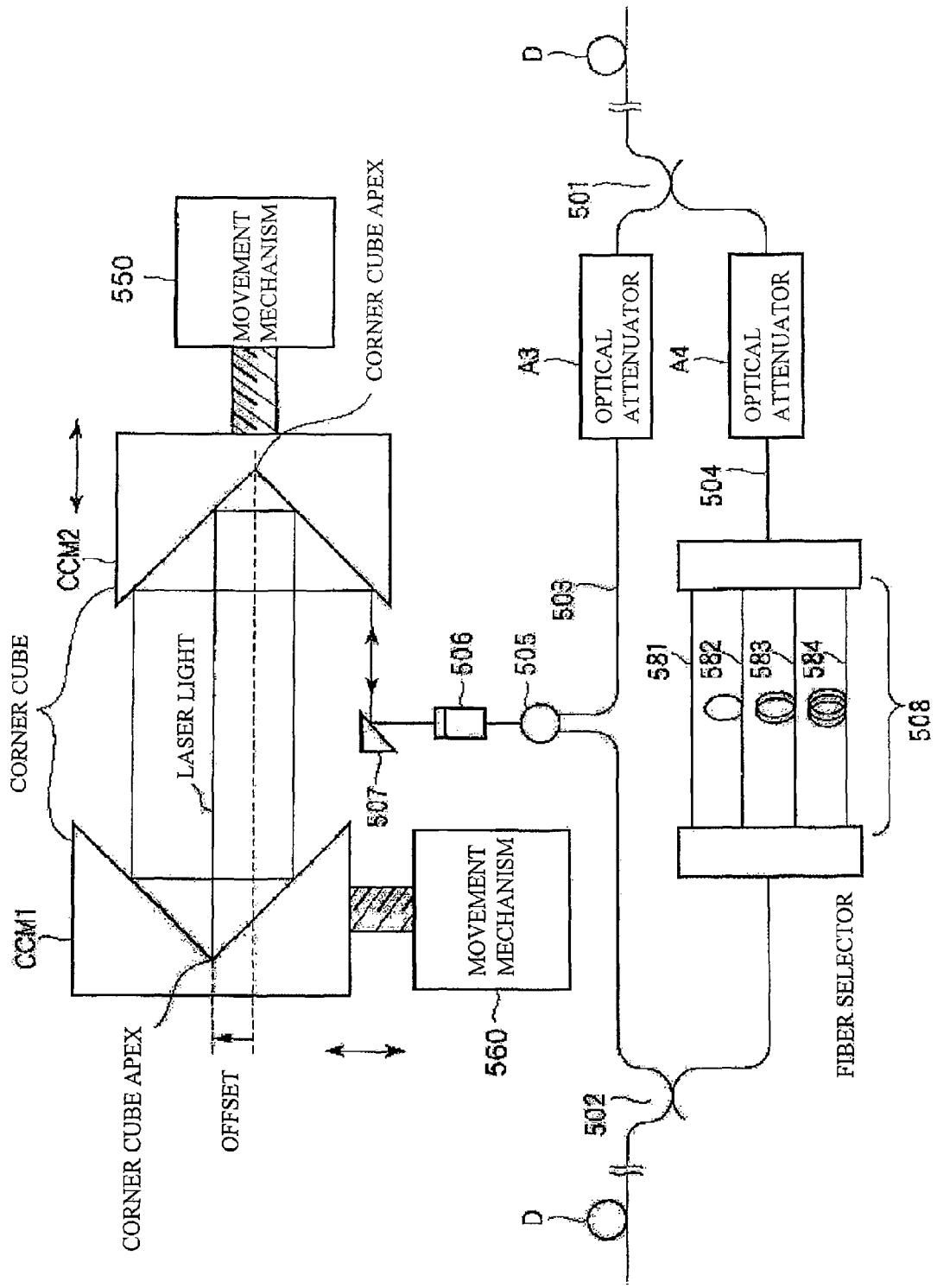
FIG. 19 is a view illustrating an embodiment of a free space optics (FSO) device according to the present disclosure.

Next, the FSO device 131 described in FIGS. 5 and 12 will be described. In the following description, "communication light" refers to light including the optical transmission signal and the chirped pulse light described in FIGS. 5 and 12. FIG. 19 is a diagram illustrating a FSO device according to a first embodiment. The device is disposed in the middle of a detour line D connected to an in-service line (not shown). In FIG. 19, the detour line D is dualized into an optical fiber 503 and an optical fiber 504 through WIC couplers 501 and 502. The optical fiber 504 is a sub-optical line that is disposed in parallel with the optical fiber 503. Optical attenuators A3 and A4 that can adjust optical power are disposed in the optical fibers 503 and 504, respectively.

Communication light propagated along the optical fiber 503 is introduced into a collimator 506 through an optical circulator 505. The communication light whose optical axis is adjusted by the collimator 506 is irradiated to a corner cube CCM2 through a reflecting mirror 507. The corner cube CCM2 moves in an optical axial direction by a horizontal movement mechanism 550, so that a distance from a corner cube CCM1 facing in the optical axial direction is adjusted.

Generally, the corner cube has a characteristic of reflecting incident light in the completely same direction. That is, light incident to the corner cube is reflected in a precisely reverse direction. Thus, in FIG. 19, an intermediate line of reflected incident lights that are parallel passes through the apexes of the corner cubes CCM1 and CCM2.

That is, the communication light whose direction has been changed by the reflecting mirror 507 is repetitively reflected between the corner cubes CCM1 and CCM2 several times and returns to the reflecting mirror 507 and then re-coupled from the collimator 506 to the optical fiber 503 through the optical circulator 505. The re-coupled communication light returns to the detour line D through the WIC coupler 502. As described above, an optical system including the collimator 506 and the optical circulator 505 forms an input/output (I/O) port having directivity.

Meanwhile, in the middle of the path of the optical fiber 504, a fiber selector 508 that can select a plurality of delay fibers 581-584 is disposed. That is, the fiber selector 508 selectively couples the communication light propagated along the optical fiber 504 to any one of the delay fibers 581 to 584. The optical line lengths of the delay fibers 581 to 584 are different from each other in a stepwise manner.

In FIG. 19, the corner cube CCM1 moves in a direction vertical to the optical axial direction by a vertical movement mechanism 560. Thus, the number of times that the communication light is reflected can increase or decrease in a stepwise manner. Specifically, there is a certain relationship between position misalignment (offset) between the apexes of the corner cubes CCM1 and CCM2 on the optical axis and the number of reflection times.

For example, it is assumed that the communication light from the collimator 506 is incident to the position of three times of the distance from the apex of the corner cube CCM2 according to the optical axis. For easy confirmation, under this condition, the communication light is re-coupled to the collimator 506 due to a characteristic of the corner cube. At this time, the communication light is twice reflected by the corner cube CCM2 and then arrives at the apex of the corner cube CCM1, is then reflected therefrom, and reversely traces the same route. Thus, if the corner cube CCM2 moves along the optical axis by 1 cm, the optical line length changes by 8 cm due to a geometrical condition. Further, as in this embodiment, the number of times that the communication light is reflected changes by moving the corner cube CCM1 in a direction vertical to the optical axis. If the number of reflection times changes, it is possible to change an optical line length change amount on a unit length movement amount of the corner cube CCM2.

Figure 20:
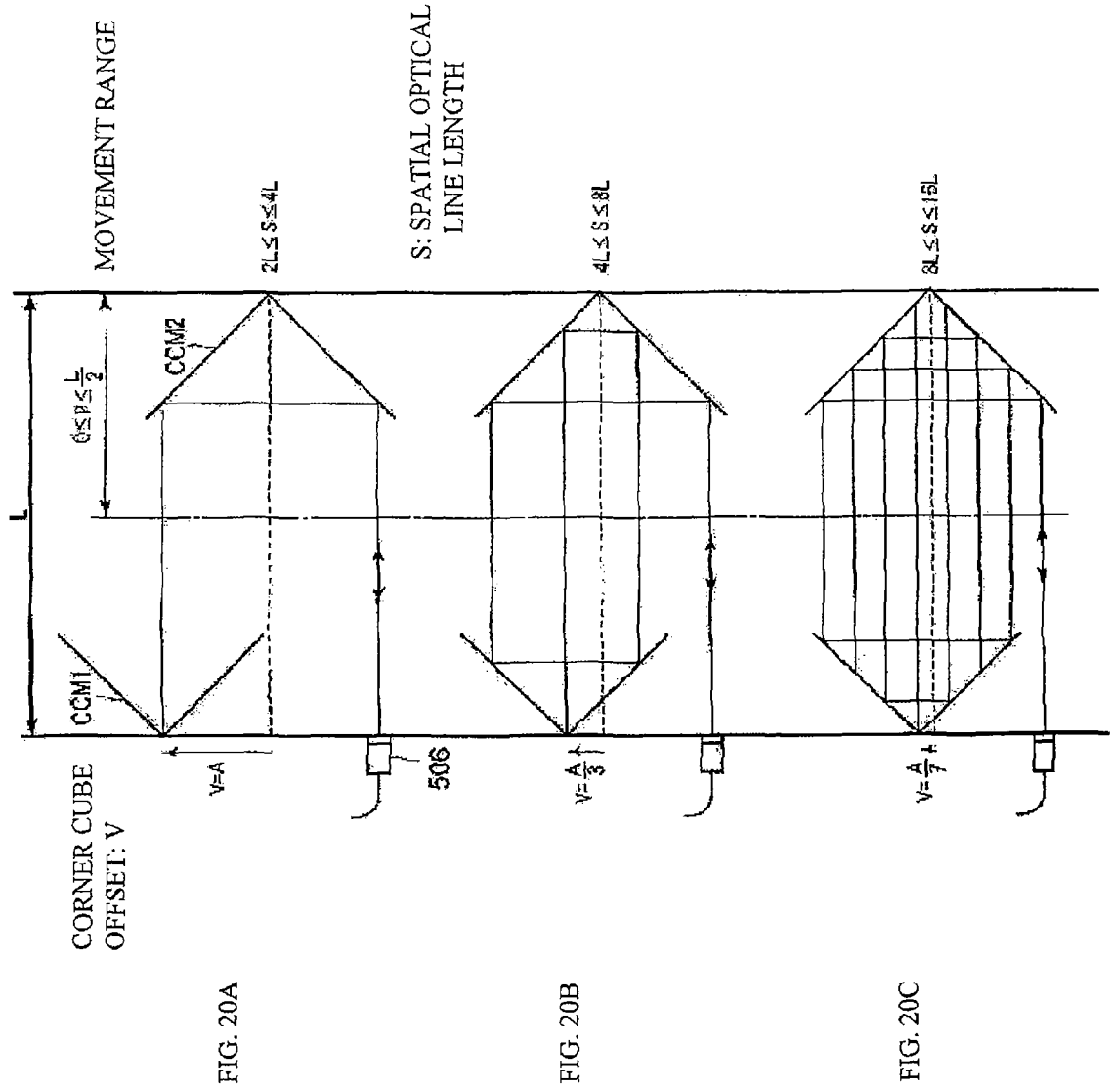
FIG. 20A is a view illustrating a relationship between the number of reflection times and an optical line length between corner cubes.
FIG. 20B is a view illustrating a relationship between the number of reflection times and an optical line length between corner cubes.
FIG. 20C is a view illustrating a relationship between the number of reflection times and an optical line length between corner cubes.

FIG. 20 is a view illustrating a relationship between the number of reflection times and the optical line length between the corner cubes. It is assumed that a movement range (a horizontal movement range) of the corner cube CCM2 at the right side by the horizontal movement mechanism 550 is L/2. That is, it is assumed that a distance between the apexes of the corner cubes CCM1 and CCM2 changes in a range between L/2 and L. Further, it is assumed that an axis of light emitted from the collimator 506 is fixed to the position (for example, a lower side in the drawing) that is away by A from a reference horizontal axis passing through the apex of the corner cube CCM2. As illustrated in the optical line views of FIGS. 20 and 21, in this embodiment, by disposing the optical circulator 505, the communication light exits or re-enters through the single collimator 506.

As illustrated in FIG. 20A, when a corner cube offset V is A (V=A), the communication light is once reflected by the corner cube CCM1 and returns to the collimator 506. Thus, when the corner cube CCM2 moves by L/2, an adjustment range of a spatial optical line length S is 2L≤S≤4L. Similarly, as illustrated in FIG. 20B, when V=A/3, 4L≤S≤8L is established. As illustrated in FIG. 20C, when V=A/7, 8L≤S≤16L is established. That is, by changing the number of reflection times, the spatial optical line length S can vary in a range of 14L between 2L and 16L.

However, in each number of reflection times, when returning the right corner cube CCM2 to an original point, it is necessary to evacuate the communication light to the optical fiber 504 (FIG. 19) side. Further, at that time, when the optical line length difference between the optical fibers 503 and 504 exceeds a specified value (for example, 8 cm), a communication service is disrupted.

Thus, in this embodiment, a delay fiber having a length enough to compensate for the optical line difference length is connected to the fiber selector 508. Specifically, when the spatial optical line length S between the corner cubes is, for example, 4L at maximum in FIG. 20B, the optical line length of the delay fiber 581 becomes equal to 4L.

If it becomes a state of S=4L, the delay fiber 581 is selected by the fiber selector 508, and the optical attenuators A3 and A4 operate to temporarily dualize the communication light into the optical fibers 503 and 504. Thereafter, the communication light at the optical fiber 503 side is blocked, and the communication light is transmitted only to the optical fiber 504 side. That is, the communication light is detoured to the optical fiber 504 side. As a result, when FIG. 20(A) status "V=A, P=L/2, S=4L" is switched to FIG. 20(B) status "V=A/3, P=0, S=4L," even if the communication light returns to the optical fiber 503 side, the optical line length does not change.

Similarly, when the spatial optical line length S between the corner cubes is 8L at maximum in FIG. 20B, the optical line length of the delay fiber 582 becomes equal to 8L. If the communication light is transmitted to the delay fiber 582, switching from FIG. 20(B) status "V=A/3, P=L/2, S=8L" to FIG. 20C status "V=A/7, P=0, S=8L" can be performed without changing the optical line length between the WIC couplers 1 and 2.

Thus, if the delay fibers 581 and 582 having the above described optical line length are prepared in the fiber selector 508, the optical line length between the WIC couplers 501 and 502 can continuously be changed in a range of 14L (=16L−2L). That is, a corner cube movement mechanism having only a finite movement range can effectively be used.

As described above, according to the first embodiment, in the FSO device in which the communication light is reflected between a pair of corner cubes CCM1 and CCM2 disposed facing each other, and the optical line length is adjusted by varying the distance between the corner cubes CCM1 and CCM2, the vertical movement mechanism 560 that moves one corner cube CCM1 in a direction vertical to the optical axis is disposed, and the number of reflection times is switched by varying the offset between the corner cubes CCM1 and CCM2. Thus, even if the movement range of the horizontal movement mechanism 550 is limited, it is possible to achieve the optical line length variable range that exceeds the movement range. Further, in this embodiment, the fiber selector that evacuates the communication light to the optical fiber 504 at the time of switching is disposed, and the optical line difference length between before evacuation and after evacuation is resolved. As a result, the optical line length difference can be suppressed within the specified value at the time of evacuation of the communication light, and the communication service is not disrupted.

It is difficult in terms of device size or cost to increase the distance that can be supported by the corner cube movement mechanism for adjusting the optical line length. On the other hand, according to the first embodiment, by switching the number of reflection times, the optical line length adjustment range larger than the movement mechanism adjustment range can be obtained. As a result, the FSO device that can broadly change the optical line length can be provided.

(Second Embodiment of FSO Device)

Figure 22:
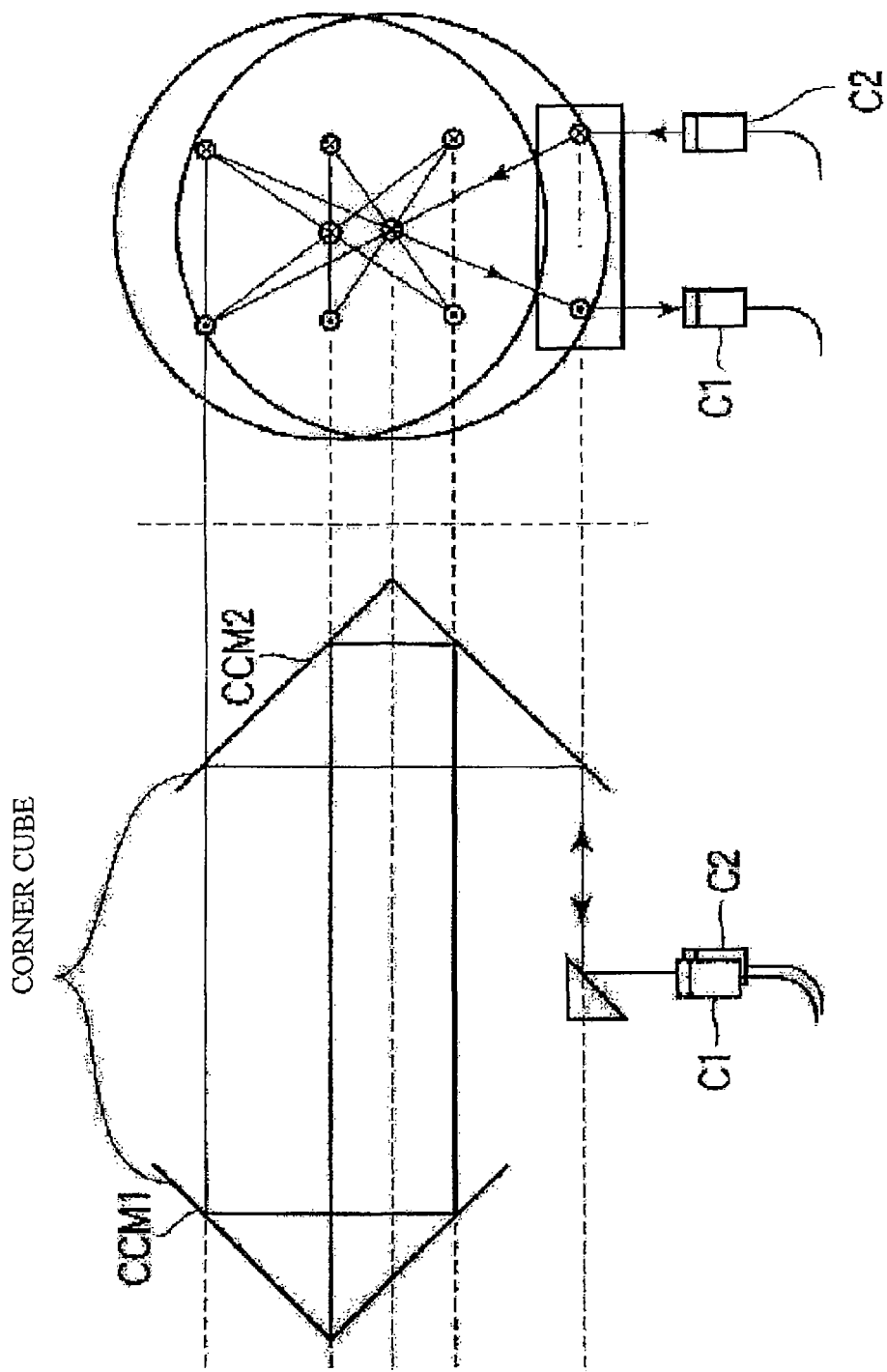
FIG. 22 is a view illustrating a free space optical system in a FSO device according to the present disclosure.

FIG. 22 is a view illustrating a FSO device according to a second embodiment. In this embodiment, two collimators C1 and C2 are disposed on a spatial optical system including the corner cubes CCM1 and CCM2. The collimator C2 is used for light incidence to the spatial optical system, and the collimator C1 is used for recombination from the spatial optical system to the optical fiber 503. The collimators C1 and C2 are disposed at the positions that are point-symmetrical to the optical axes of the corner cubes CCM1 and CCM2.

Figure 21:
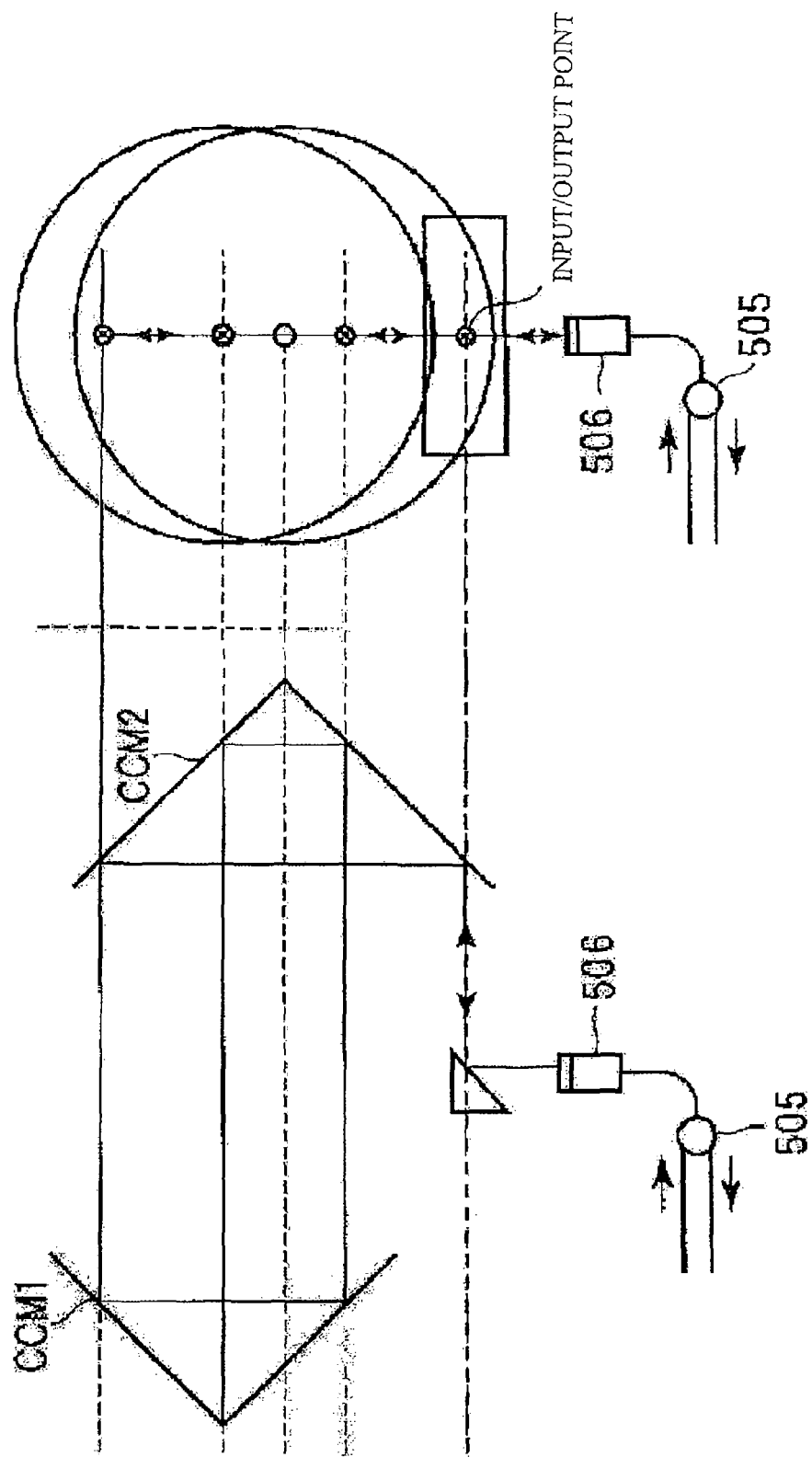
FIG. 21 is a view illustrating an example of an optical line diagram of a free space optical system.

If the optical line is observed in a direction vertical to the optical axis and vertical to a corner cube offset direction, the optical line of the spatial optical system illustrated in FIG. 22 is completely the same as the optical line in the first embodiment illustrated in FIG. 21. If the present collimator and the corner cube observed from the direction have the same position relationship, the spatial optical line lengths of FIGS. 21 and 22 become equal. Thus, the same effect as in the first embodiment can be obtained by the second embodiment. In FIG. 22, the optical circulator is not necessary, and thus there is a merit capable of simplifying the configuration.

(Third Embodiment of FSO Device)

Figure 23:
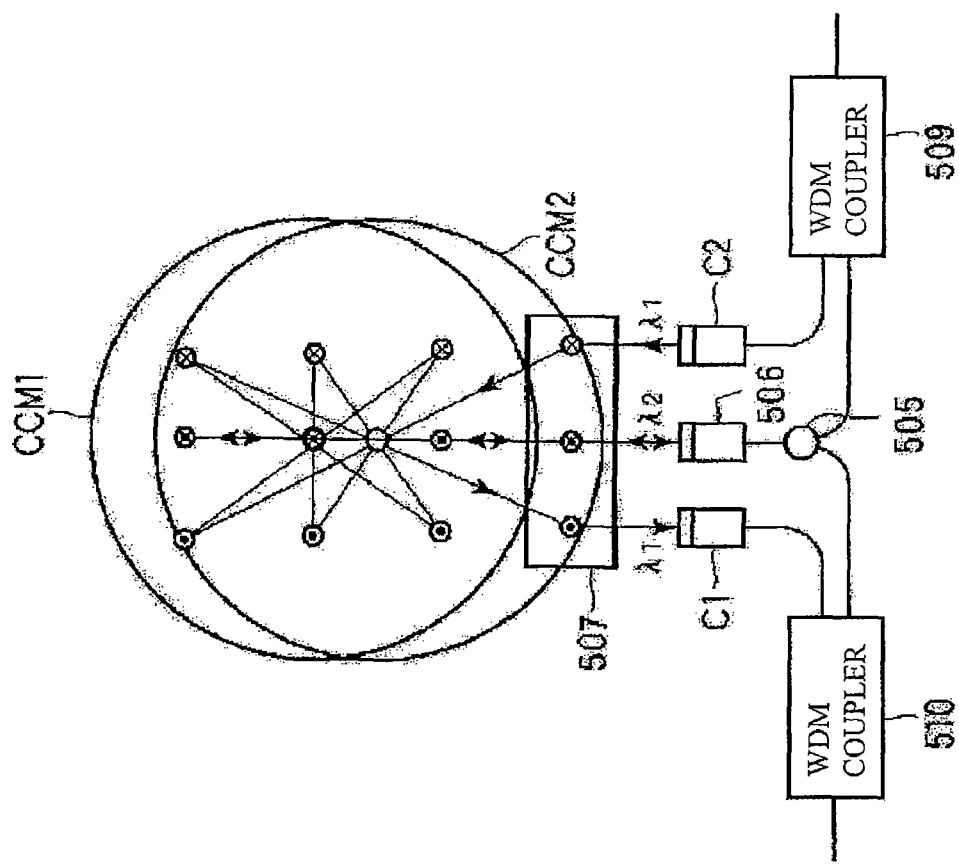
FIG. 23 is a view illustrating a free space optical system in a FSO device according to the present disclosure.

FIG. 23 is a view illustrating a FSO device according to a third embodiment. The FSO device of FIG. 23 is one which the two types of FSO devices illustrated in FIGS. 21 and 22 are superimposed on each other. A different wavelength is allocated to each spatial optical system. That is, a wavelength λ2 is allocated to the spatial optical system having the optical circulator 505, and a wavelength 21 is allocated to the spatial optical system having no optical circulator 505.

The communication light of wavelength λ1 and the communication light of wavelength λ2 flow through the optical fiber 504, and they are demultiplexed by the WDM coupler 509. The wavelength light λ1 is guided from the collimator C2 to a space between the corner cubes CCM1 and CCM2 through the reflecting mirror 507, repetitively reflected, then arrives at the collimator C1, and re-combined to the optical fiber 504 through the WDM coupler 510. The wavelength light λ2 is guided from the collimator 506 to a space between the corner cubes CCM1 and CCM2 through the reflecting mirror 507, repetitively reflected, then returns to the collimator 506, and re-combined to the optical fiber 504 through the WDM coupler 510.

Through the above configuration, when the optical transmission signals of various wavelengths are used, it is possible to design a spatial optical system suitable for a wavelength characteristic. Further, by disposing another one set of collimators in the configuration of FIG. 23 and superimposing the spatial optical systems, an optical system that can cope with three wavelengths can be configured. As an opposite concept, the optical transmission signal of the same wavelength can be allocated to different spatial paths.

As described above, according to the present disclosure, a large optical line length adjustment range that exceeds an adjustment range of a movement mechanism of a corner cube can be obtained. Thus, when a detour line that temporarily dualizes an optical circuit is configured, in an optical line length adjustment mechanism that prevents a communication service from being disrupted, an optical line length can broadly be changed.

The present disclosure is not limited to the above embodiments. For example, since the propagation speed in a fiber core is different from that in a space, if extension of an optical line length is considered through fiber length reduction, reduction of a spatial optical line length according to a propagation speed difference can be performed.

Figure 24:
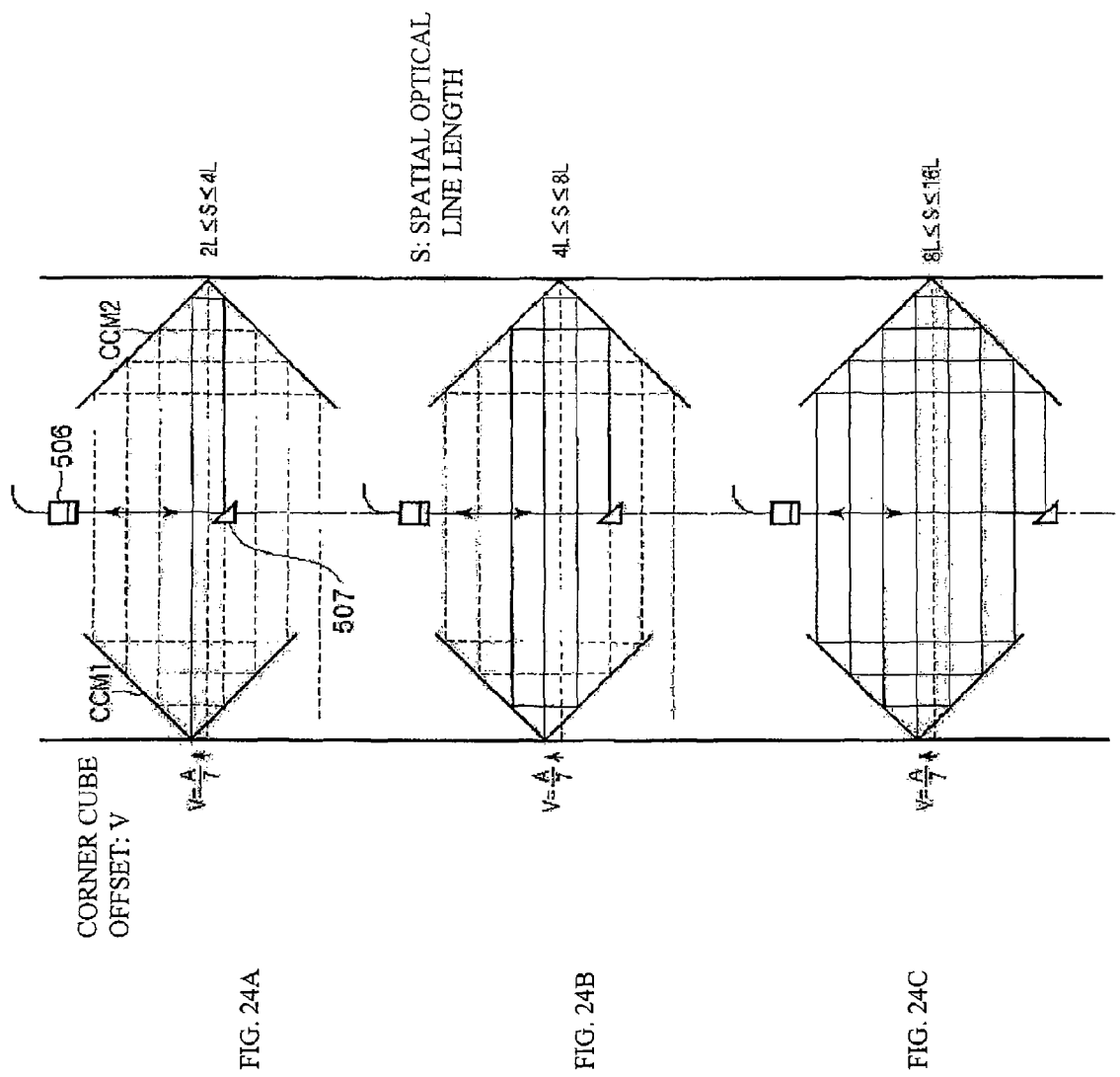
FIG. 24A is a view illustrating another example of switching of the number of reflection times.
FIG. 24B is a view illustrating another example of switching of the number of reflection times.
FIG. 24C is a view illustrating another example of switching of the number of reflection times.

The moving method of a movement mechanism, or combination of the delay fibers by the fiber selector 508, are not limited the above described examples, and various configurations are conceivable. For example, as illustrated in FIG. 24, in a state in which an offset between the corner cubes CCM1 and CCM2 is fixed, the collimator 506 or the reflecting mirror 507 may move in a direction vertical to the optical axis.

FIGS. 24(A) to 24(C) illustrate aspects of moving the reflecting mirror 507 in a direction vertical to the optical axis. As the reflector 507 gets away from the optical axis, the number of reflection times increases, and the statuses of FIGS. 20(A) to 20(C) can be implemented. That is, by changing the incident position of the communication light incident between the corner cubes CCM1 and CCM2 in a direction vertical to the optical axis, the number of reflection times can vary, and the optical line length adjustment range that exceeds the adjustment range of the horizontal movement mechanism 550 can be obtained.

(Fourth Embodiment of FSO Device)

Figure 25:
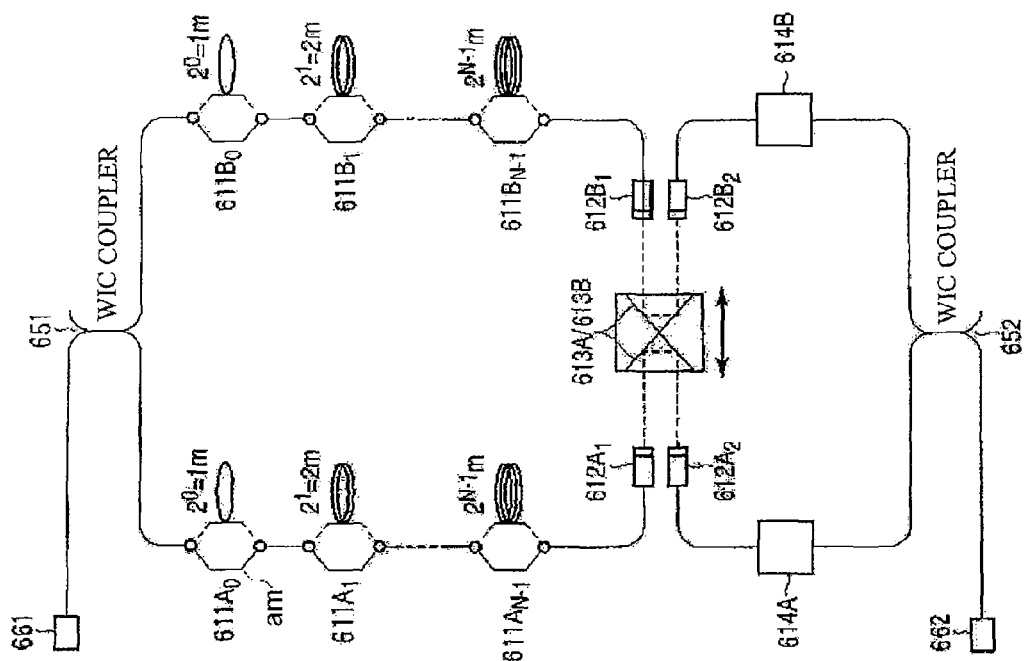
FIG. 25 is a view illustrating an embodiment of a FSO device according to the present disclosure.

FIG. 25 is a view illustrating a FSO device according to a fourth embodiment. In FIG. 25, $611A_0$ to $611A_{N-1}$ and $611B_0$ to $611B_{N-1}$ represent optical switches that can select two types of optical fibers having different lengths and are serially connected in N stages as a system A and a system B, respectively. In each system, an optical fiber having a short length (for example, a=0.1 m) is connected to one end of each of the optical switches $611A_0$ to $611A_{N-1}$ and $611B_0$ to $611B_{N-1}$ and an optical fiber having a length of 1+0.1 m, 2+0.1 m, 4+0.1 m, ..., and $2^{N-1}+0.1$ m is connected to the other end thereof. In each of the optical switches $611A_0$ to $611A_{N-1}$ and $611B_0$ to $611B_{N-1}$ of the optical systems, the fiber can independently be selected.

Here, if each length between the optical switches is ignored, the entire length of the optical switches can be changed by 1 m from 0.1×Nm to $2^{N-1}$+0.1×Nm by combining ON and OFF of the optical switches $611A_0$ to $611A_{N-1}$ and $611B_0$ to $611B_{N-1}$.

One ends of the last optical switches $611A_{N-1}$ and $611B_{N-1}$ are connected to the collimators $612A_1$ and $612B_1$, respectively, and light beams output therefrom are reflected by the corner cubes 613A/613B, input to the collimators $612A_2$ and $612B_2$, and guided to the optical attenuators 614A and 614B, respectively. The corner cube 613A/613B is movable in an optical axial direction of the collimators $612A_1$, $612B_1$, $612A_2$, and $612B_2$, and the optical line length between the collimators $612A_1$ and $612A_2$ or between $612B_1$ and $612B_2$ of each of the systems A and B can continuously be changed.

As described above, in the present device, the optical lines of the two systems (A and B) are prepared, coupled by the WIC couplers 651 and 652 in parallel, and connected to I/O ports 661 and 662 of a set of light. The corner cube 613A/613B is integrated such that their back surfaces are bonded. A movement mechanism is shared, and so if an optical line length of one system is extended, an optical line length of the other system is contracted.

FIG. 26 is a view for explaining switching timing of each of the optical switches $611A_0$ to $611A_{N-1}$ and $611B_0$ to $611B_{N-1}$ and positioning of the corner cube 613A/613B when an optical line length between the optical I/O ports 661 and 662 is continuously extended in the embodiment of FIG. 25. ON and OFF of the optical attenuators 614A and 614B represent conduction and blocking of light, respectively.

Figures 26A, 26B:
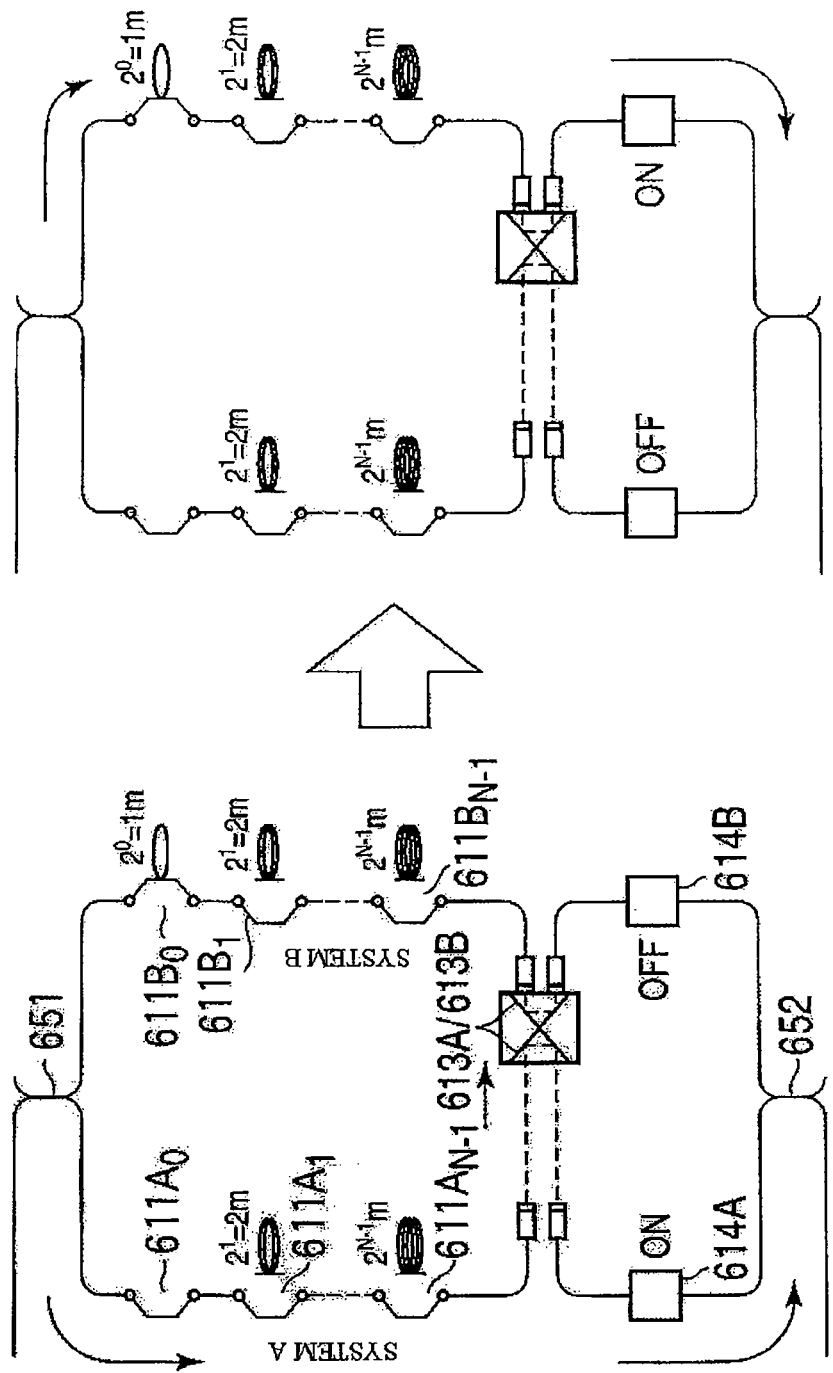
FIG. 26A is a view for explaining an adjustment (extension) method of a FSO device according to the present disclosure.
FIG. 26B is a view for explaining an adjustment (extension) method of a FSO device according to the present disclosure.

If a movement range of the corner cube 613/613B is set to 0.5 m, a spatial distance change amount between a set of collimators is 1 m. It is assumed that only the system A is initially conducted, all of the optical switches $611A_0$ to $611A_{N-1}$ select the short fiber (a=0.1 m), and the corner cube 613A/613B is disposed at the position at which the spatial optical line length of the system A side is shortest. Thus, as illustrated in FIG. 26(A), if the corner cubes 613A and 613B move to the system B side, the optical line length of the system A is stretched by 1 m.

Figure 26D:
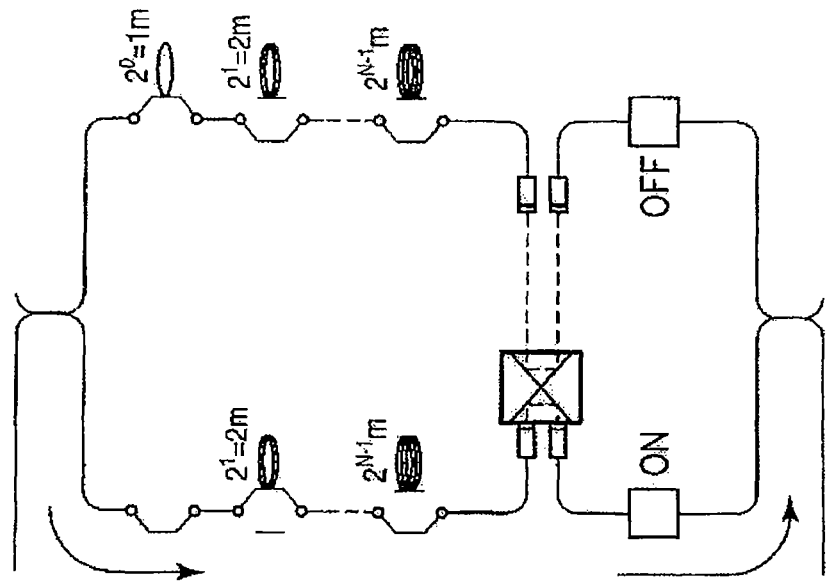
FIG. 26D is a view for explaining an adjustment (extension) method of a FSO device according to the present disclosure.
Figure 26C:
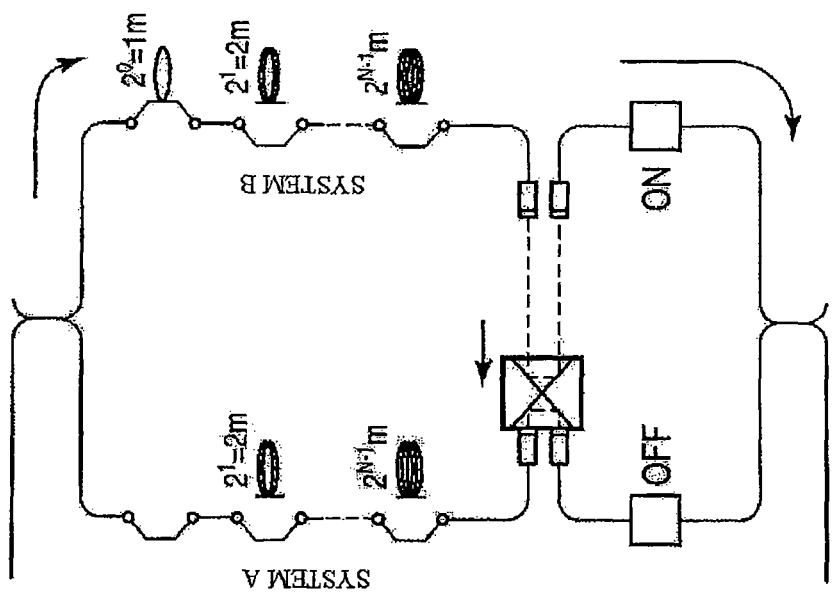
FIG. 26C is a view for explaining an adjustment (extension) method of a FSO device according to the present disclosure.

Here, if selection of the optical switch $611B_0$ of the system B is set to 1 m and selection of the other optical switches $611B_1$ to $611B_{N-1}$ is set to a m, the optical line lengths of the two systems become equal. For this reason, temporary dualization is performed, ON and OFF of the optical attenuators 614A and 614B are switched, and so light is conducted only to the system B (FIG. 26B). In this state, if the corner cube 613A/613B moves to the system A side, the optical line length of the system B is extended by 1 m, and thus the optical line length of the system A is also extended by 2 m compared to the initial state (FIG. 26C). Here, if selection of the optical switch $611A_1$ of the system A is set to 2 m and selection of the other optical switches $611A_0$ and $611A_2$ to $611A_{N-1}$ is set to a m, the optical line lengths of the two systems become equal. Thus, temporary dualization is performed, ON and OFF of each of the optical attenuators 614A and 614B are then mutually switched, and so light can be conducted only to the system A (FIG. 26D).

Hereinafter, by performing the same operation, the optical line length can continuously be extended by $2^1\%$ at maximum compared to the initial state. Since the optical lines of the two systems have been extended by 2 m, respectively, by reciprocation of the corner cube 613A/613B, fibers of a m and 1 m may be prepared instead of the optical switch. Meanwhile, since the propagation speed of light in the optical fiber is different from the propagation speed of light in the space, if a refractive index of the fiber core is set to 1.46, 1 m as the fiber length is 1.46 m by the spatial length reduction. For this reason, the movement range of the corner cube 613A/613B should be set according to it. Further, when each fiber length of the optical fiber is not necessarily a design value, an error may occur when matching the optical line length in the two systems. However, this problem can be resolved by introducing a structure in which a margin of a degree that falls within the movement range of the corner cube 613A/613B is allowed, and the stop position is adjusted at every dualization to absorb the error.

In the present disclosure, the optical switch that selects the two types of optical fibers has been used, but the present disclosure is not limited to the configuration. For example, switching on an optical fiber group having the length based on an expression such as a ternary notation using an optical switch that can perform selection of three types can be implemented in a similar manner. Further, a corner cube movement mechanisms for continuously changing the optical line length have been shared by the two systems. However, the same effect as in the present embodiment can be obtained by differently configuring the two systems or disposing the mechanism in one system.

(Fifth Embodiment of FSO Device)

Figures 27A, 27B:
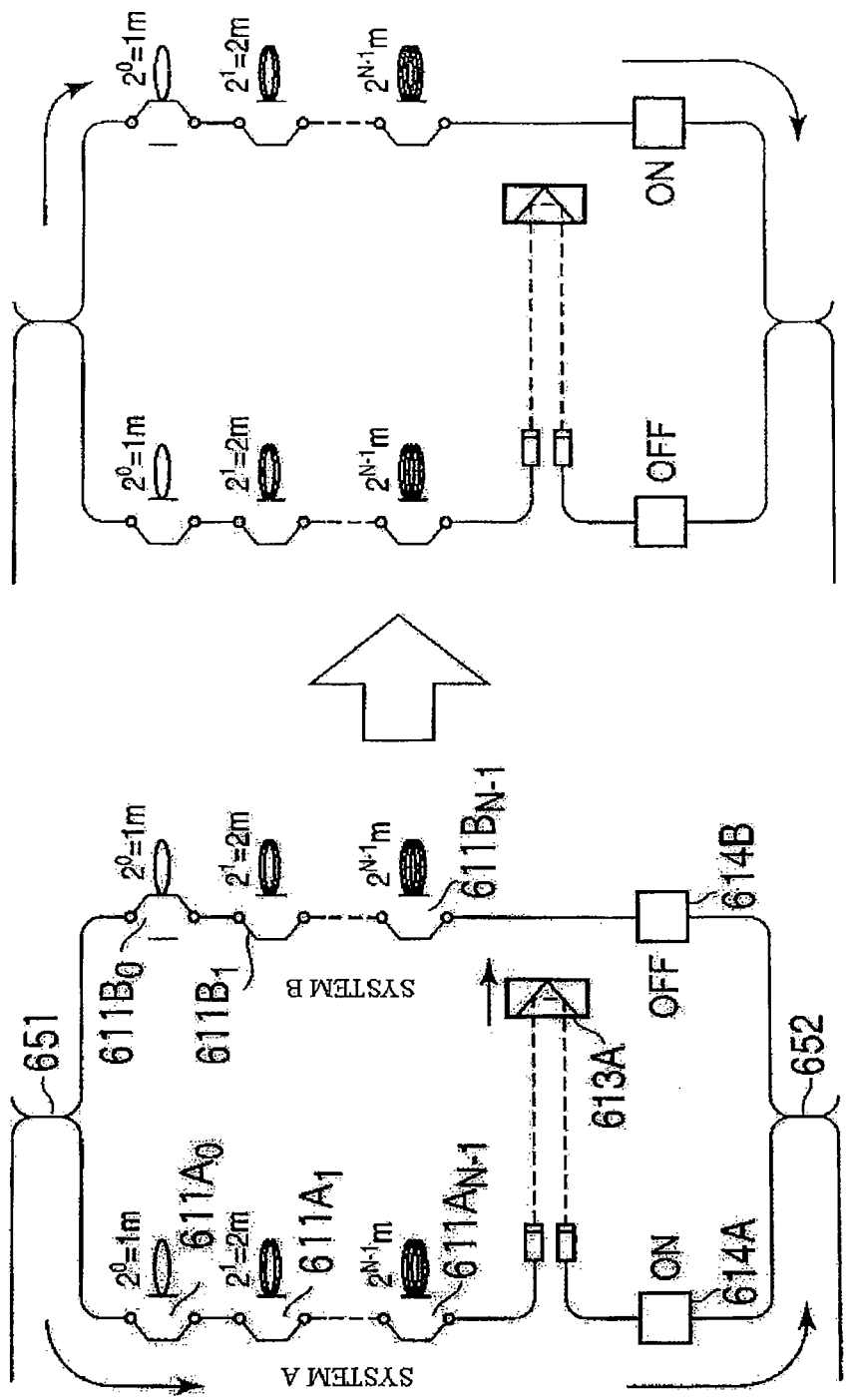
FIG. 27A is a view for explaining an optical line length extension method when only one system has a continuous extension function in a FSO device according to the present disclosure.
FIG. 27B is a view for explaining an optical line length extension method when only one system has a continuous extension function in a FSO device according to the present disclosure.

FIG. 27A illustrates an optical line length extension technique when the corner cube is disposed in on side. In this case, the movement range of the corner cube is 0.5 m, but the optical line length is extended by 1 m by one time reciprocation. It is assumed that only the system A is initially conducted, all of the optical switches $611A_0$ to $611A_{N-1}$ selects the short fiber (a=0.1 m), and the corner cube 613A is disposed at the position at which the spatial optical line length of the system A side becomes shortest. Thus, as illustrated in FIG. 27A, if the corner cube 613A moves to the system B side, the optical line length of the system A is extended by 1 m.

Figure 27D:
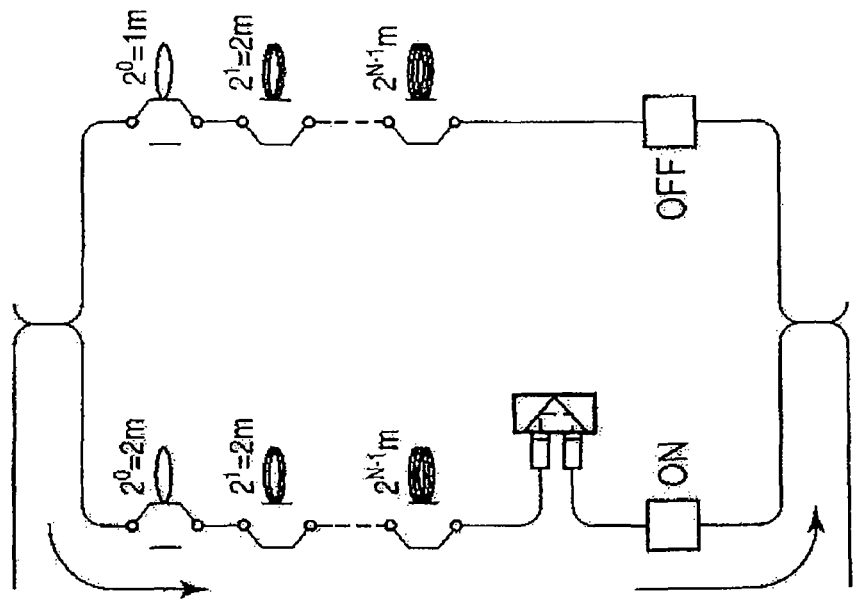
FIG. 27D is a view for explaining an optical line length extension method when only one system has a continuous extension function in a FSO device according to the present disclosure.
Figure 27C:
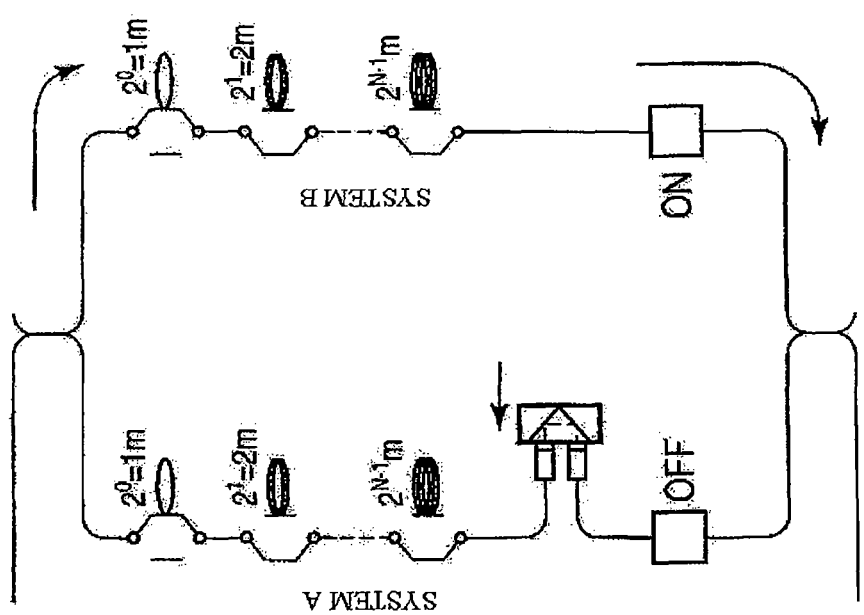
FIG. 27C is a view for explaining an optical line length extension method when only one system has a continuous extension function in a FSO device according to the present disclosure.

Here, if selection of the optical switch $611B_0$ of the system B is set to 1 m and selection of the other optical switches $611B_1$ to $611B_{N-1}$ is set to a m, the optical line lengths of the two systems become equal. For this reason, temporary dualization is performed, ON and OFF of each of the optical attenuators 614A and 614B are switched, and so light is conducted only to the system B (FIG. 27B). In this state, if the corner cube 613A moves to the system A side, selection of the optical switch $611A_0$ of the system A is set to 1 m, and selection of the other optical switches $611A_1$ to $611A_{N-1}$ is set to a m, the optical line lengths of the two systems become equal (FIG. 27C). For this reason, temporary dualization is performed, ON and OFF of each of the optical attenuators 614A and 614B are switched, and so light can be conducted only to the system A (FIG. 27D).

As described above, using the present FSO device, the optical line length of the optical line can continuously be changed. Thus, for example, if a work such as interference relocation is necessary on the in-service line, an optical line length adjustment mechanism for preventing a communication service from being disrupted when configuring a detour line for temporarily dualizing communication light can be provided. Even when an adjustment range of a line length is several hundreds of miters, by preparing an optical switch group having a fiber length based on a binary notation, it is possible to make compact a continuous optical line length varying mechanism constructed by a combination of a corner cube and a collimator.

In the above embodiment, a case of a binary notation has been described as an example, but the present FSO device is not limited to the binary notation. It should be noted that the present FSO device can be implemented even in an optical switch group based on a base-n notation (n≥3). For example, in the above embodiment, n is 2, a first stage is a and a+1, a second stage is a and a+2, a third stage is a and a+4, . . . , but if n is 3, a first stage is a, a+1, and a+2, a second stage is a, a+3, and a+6, and a third stage is a, a+9, and a+18, . . . .

Further, the present disclosure is not limited to the above embodiment "as is," and in an implementation phase, a component can be modified and embodied within the scope without departing from the spirit thereof. Various disclosures can be derived by an appropriate combination of a plurality of components disclosed in the embodiments. For example, several components may be deleted from all components shown in the embodiments. Further, a component according to a different embodiment may appropriately be combined.

The invention claimed is:

1. An optical communication switching system in which dualized lines are formed by selectively connecting a second optical transmission line between first and second optical transmission devices separately from a first optical transmission line, the optical communication switching system comprising:
a first optical coupler means in which an optical signal I/O terminal of the first optical transmission device is connected to a first optical I/O terminal, and each of one sides of the first and second optical transmission lines is connected to second and third I/O terminals;
a second optical coupler means in which an optical signal I/O terminal of the second optical transmission device is connected to a first optical I/O terminal, and each of the other sides of the first and second optical transmission lines is connected to second and third I/O terminals;
a test light source that is connected to a fourth optical I/O terminal of the second optical coupler means and transmits pulse light in which an optical frequency is chirped;
an optical measurement device that is connected to a fourth optical I/O terminal of the first optical coupler means and measures pulse light output from the terminal; and
a free space optics (FSO) device that is disposed on the second optical transmission line and compensates for a transmission time of pulse light transmitted through the line by expansion and contraction of a spatial optical line length;
wherein pulse light transmitted from the test light source is branched by the second optical coupler means, pulse light that has passed through the first optical transmission line and pulse light that has passed through the second optical transmission line are multiplexed by the first optical coupler means and then input to the optical measurement device, an arrival time of pulse light passing through each optical transmission line and an interference waveform generated in an upper part of a pulse waveform are measured by the optical measurement device, an optical line length of the FSO device is adjusted so that the interference waveform becomes appropriate while matching the measured arrival time of the pulse light, and an optical transmission signal between the first and second optical transmission devices is switched from the first optical transmission line to the second optical transmission line;
wherein the test light source emits pulse light in which the optical frequency is chirped linearly or in a state close to a linear form,
the optical measurement device includes a Fast Fourier transformer (FFT) that performs Fast Fourier transform on an interference waveform generated in an upper part of the pulse light waveform, and
for an adjustment of the interference waveform, Fast Fourier transform is performed on the interference waveform, an optical line length of the FSO device is extended or contracted so that using a specific frequency component obtained at that time as a reference, the component moves to a frequency zero side, the optical line length is continuously extended or contracted again until the frequency component as the reference is measured, and the FSO device is adjusted so that the optical line length becomes half the extended or contracted length.

2. The optical communication switching system according to claim 1, further comprising:
a level adjustment means that is disposed on at least one of the first optical transmission line and the second optical transmission line and, when an optical transmission signal transmitted between the first optical transmission device and the second optical transmission device passes through both the first optical transmission line and the second optical transmission line, generates a level difference on power of the optical transmission signal.

3. The optical communication switching system according to claim 1,
wherein, for an adjustment of the interference waveform, an optical line length of the FSO device is adjusted so that a size of an upper limit and a lower limit of the interference waveform becomes minimum.

4. The optical communication switching system according to claim 1,
wherein the FSO device comprises:
a pair of corner cubes disposed in a reference axial direction, facing each other;
an optical system that irradiates light propagated along an optical line inserted into the second optical transmission line between the corner cubes and re-couples light reflected between the corner cubes to the optical line;
an adjustment means that changes a distance between the corner cubes in the reference axial direction and adjusts a length of a reflection path of the light;
a switching means that switches the number of times that the light is reflected between the corner cubes in a stepwise manner; and
an evacuation means that evacuates the light to a sub-optical line in which an optical line length difference with the optical line is equal to or less than a specified value at the time of switching of the number of reflection times.

5. The optical communication switching system according to claim 4,
wherein the switching means comprises a movement mechanism that changes an offset between the corner cubes in a direction vertical to the reference axial direction.

6. The optical communication switching system according to claim 4,
wherein the switching means comprises a movement mechanism that changes an incident position of light incident between the corner cubes in a direction vertical to the reference axial direction.

7. The optical communication switching system according to claim 4,
wherein the sub-optical line comprises:
a plurality of light waveguides that have different optical line lengths in a stepwise manner; and
a selection means that selectively couples the light to any one of the plurality of light waveguides.

8. The optical communication switching system according to claim 4,
wherein the optical system comprises:
a collimator; and
an optical circulator that derives light propagated along the optical line to the collimator and introduces light returned to the collimator to the optical line.

9. The optical communication switching system according to claim 4,
wherein the optical system comprises:
first and second collimators that are disposed to be point-symmetrical to the reference axis; and
a means that derives light propagated along the optical line to the first collimator and introduces light returned to the second collimator to the optical line.

10. The optical communication switching system according to claim 4,
wherein the light includes first light and second light that are different in wavelength, and
the optical system comprises:
a separation means that performs wavelength separation on the first light and the second light that are propagated along the optical line;
a first collimator;
an optical circulator that derives the wavelength-separated first light to the first collimator and introduces the first light returned to the first collimator to the optical line;
second and third collimators that are disposed to be point-symmetrically to the reference axis; and
a means that derives the wavelength-separated second light to the second collimator and introduces the second light returned to the third collimator to the optical line.

11. The optical communication switching system according to claim 1,
wherein the FSO device comprises:
a pair of optical couplers that branch-couples an optical line between a pair of optical I/O ports inserted into the second optical transmission line to two systems of optical lines;
a pair of optical attenuators that are disposed on the two systems of optical lines, respectively, and turn on or off optical transmission of the optical lines of a corresponding system;
a pair of optical switch circuits that are disposed on the two systems of optical lines, serially connect optical switches, which selectively switching-connect n (n is a natural number equal to or more than 2) systems, respectively, in multiple stages, and extends an optical line length in certain length unit by selectively connecting a plurality of optical fibers whose length is adjusted in certain length unit by each optical switch; and
an optical line length adjustment means that is disposed on at least one of the two systems of optical lines and continuously varies an optical line length of the optical line of a corresponding system by the certain length or more.

12. The optical communication switching system according to claim 11,
wherein the optical coupler has a characteristic that does not depend on a wavelength of transmission light.

13. The optical communication switching system according to claim 11,
wherein the optical line length adjustment means comprises:
a corner cube that reflects light emitted from a part of the optical line and returns to the optical line; and
a movement mechanism that moves the corner cube along an axis of light output from the optical line and reflected light.

14. The optical communication switching system according to claim 11,
wherein the optical line length adjustment means is disposed in each of the two systems, and as an optical line length of one system is extended, an optical line length of the other system is contracted.

15. The optical communication switching system according to claim 11,
wherein the optical switch circuit comprises N optical switches that are serially connected and includes one side to which an optical fiber of a certain length is connected and the other side to which an optical fiber having an optical line difference length of a ratio of $2^0, 2^1, \ldots,$ and $2^{N-1}$ to the certain length is connected.

16. A dualized line switching method, comprising:
forming dualized lines by selectively connecting a second optical transmission line between first and second optical transmission devices separately from a first optical transmission line;
being used in an optical communication switching system that comprises a first optical coupler means in which an optical signal I/O terminal of the first optical transmission device is connected to a first optical I/O terminal, and each of one sides of the first and second optical transmission lines is connected to second and third optical I/O terminals, a second optical coupler means in which an optical signal I/O terminal of the second optical transmission device is connected to a first optical I/O terminal, and each of the other sides of the first and second optical transmission lines is connected to second and third optical I/O terminals, a test light source that is connected to a fourth optical I/O terminal of the second optical coupler means and transmits pulse light in which an optical frequency is chirped, an optical measurement device that is connected to a fourth optical I/O terminal of the first optical coupler means and measures the pulse light output from the terminal, and a free space optics (FSO) device that is disposed on the second optical transmission line and compensates for a transmission time of pulse light transmitted through the line by expansion and contraction of a spatial optical line length;

branching pulse light transmitted from the test light source by the second optical coupler means;

multiplexing pulse light that has passed through the first optical transmission line and pulse light that has passed through the second optical transmission line by the first optical coupler means and then inputting the multiplexed pulse light to the optical measurement device;

measuring an arrival time of pulse light passing through each optical transmission line and an interference waveform generated in an upper part of a pulse light waveform by using the optical measurement device;

adjusting an optical line length of the FSO device so that the interference waveform becomes appropriate while matching the measured arrival time of pulse light; and switching an optical transmission signal between the first and second optical transmission devices from the first optical transmission line to the second optical transmission line;

wherein the test light source emits pulse light in which the optical frequency is chirped linearly or in a state close to a linear form, and wherein when the optical measurement device includes a Fast Fourier transformer (FFT) that performs Fast Fourier transform on an interference waveform generated in an upper part of the pulse light waveform, for an adjustment of the interference waveform, Fast Fourier transform is performed on the interference waveform, an optical line length of the FSO device is extended or contracted so that using a specific frequency component obtained at that time as a reference, the component moves to a frequency zero side, the optical line length is continuously extended or contracted again until the frequency component as the reference is measured, and the FSO device is adjusted so that the optical line length becomes half the extended or contracted length.

17. The dualized line switching method according to claim 16, wherein pulse light emitted from the test light source is branched by the second optical coupler means and multiplexed by the first optical coupler means, and when an optical transmission signal transmitted between the first optical transmission device and the second optical transmission device passes through both the first optical transmission line and the second optical transmission line, a level difference is generated on power of the optical transmission signal.

18. The dualized line switching method according to claim 16, wherein for an adjustment of the interference waveform, an optical line length of the FSO device is adjusted so that a size of an upper limit and a lower limit of the interference waveform becomes minimum.

\* \* \* \* \*